US012785888B2

(12) United States Patent
Manolakos et al.

(10) Patent No.: US 12,785,888 B2
(45) Date of Patent: Nov. 3, 2026

(54) EMBEDDING TIMING GROUP INFORMATION IN REFERENCE SIGNALS FOR POSITIONING

(71) Applicant: QUALCOMM INCORPORATED, San Diego, CA (US)

(72) Inventors: Alexandros Manolakos, Escondido, CA (US); Wei Yang, San Diego, CA (US); Sony Akkarakaran, Poway, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 18/264,198

(22) PCT Filed: Feb. 9, 2022

(86) PCT No.: PCT/US2022/015733
§ 371 (c)(1),
(2) Date: Aug. 3, 2023

(87) PCT Pub. No.: WO2022/211906
PCT Pub. Date: Oct. 6, 2022

(65) Prior Publication Data

US 2024/0129085 A1 Apr. 18, 2024

(30) Foreign Application Priority Data

Mar. 31, 2021 (GR) .............................. 20210100221

(51) Int. Cl.
*H04L 5/00* (2006.01)
*H04W 56/00* (2009.01)

(52) U.S. Cl.
CPC ........... *H04L 5/005* (2013.01); *H04W 56/004* (2013.01)

(58) Field of Classification Search
None
See application file for complete search history.

(56) References Cited

U.S. PATENT DOCUMENTS

2020/0127784 A1 4/2020 Akkarakaran et al.
2021/0051622 A1 2/2021 Manolakos et al.
2021/0091905 A1 3/2021 Si et al.
2021/0219254 A1* 7/2021 Wang ................ H04W 56/0015
(Continued)

FOREIGN PATENT DOCUMENTS

WO 2020063393 A1 4/2020
WO 2020167057 A1 8/2020

OTHER PUBLICATIONS

International Search Report and Written Opinion—PCT/US2022/015733—ISA/EPO—Sep. 15, 2022.
(Continued)

*Primary Examiner* — Diane L Lo
(74) *Attorney, Agent, or Firm* — Procopio, Cory, Hargreaves & Savitch LLP

(57) ABSTRACT

Techniques are provided for embedding timing error group (TEG) information in reference signals. An example method for determining a timing error group associated with internal timing errors of a first station includes receiving the reference signal including embedded timing error group information from a first station, and determining a timing group error value based at least in part on the embedded timing error group information.

30 Claims, 17 Drawing Sheets

(56) References Cited

U.S. PATENT DOCUMENTS

| | | | | |
|---|---|---|---|---|
| 2022/0124664 A1* | 4/2022 | Cha | H04W 64/00 | |
| 2022/0150857 A1* | 5/2022 | Yang | H04W 56/0015 | |
| 2023/0184871 A1* | 6/2023 | Ernström | G01S 5/0036 | 342/450 |

OTHER PUBLICATIONS

Mediatek Inc: "Views on Positioning Enhancement for Rel-17", 3GPP TSG-RAN WG1 #103 Meeting, R1-2008519, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020 Oct. 17, 2020, XP051940197, 18 Pages, Section 3, p. 8.

Partial International Search Report—PCT/US2022/015733—ISA/EPO—May 31, 2022.

* cited by examiner

1030

1032 1034

| Scrambling ID | TEG group ID |
|---|---|
| A | 1 |
| B | 2 |
| C | 3 |
| D | 4 |

...

FIG. 10C

1040

1042 1044

| Cyclic Shift | TEG group ID |
|---|---|
| A | 1 |
| B | 2 |
| C | 3 |
| D | 4 |

...

FIG. 10D

EMBEDDING TIMING GROUP INFORMATION IN REFERENCE SIGNALS FOR POSITIONING

CROSS-REFERENCE TO RELATED APPLICATIONS

This application is the National Stage of International Application No. PCT/US2022/015733, filed Feb. 9, 2022, entitled "EMBEDDING TIMING GROUP INFORMATION IN REFERENCE SIGNALS FOR POSITIONING," which claims the benefit of Greek patent application No. 20210100221, filed Mar. 31, 2021, entitled "EMBEDDING TIMING GROUP INFORMATION IN REFERENCE SIGNALS FOR POSITIONING," both of which are assigned to the assignee hereof, and the entire contents of both of which are hereby incorporated herein by reference for all purposes.

BACKGROUND

Wireless communication systems have developed through various generations, including a first-generation analog wireless phone service (IG), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination. Further, 5G wireless networks may utilize uplink signals, such as Sounding Reference Signals (SRS) for positioning purposes.

SUMMARY

An example method for determining a timing error group associated with internal timing errors of a first station according to the disclosure includes receiving a reference signal including embedded timing error group information from a first station, and determining a timing group error value based at least in part on the embedded timing error group information.

Implementations of such a method may include one or more of the following features. The timing group error value may be transmitted to a second station. The embedded timing error group information may be embedded in a symbol in the reference signal. The embedded timing error group information may be embedded in a group of symbols in the reference signal. The group of symbols may include non-consecutive symbols in the reference signal. The embedded timing error group information may be embedded in each symbol of the reference signal. The reference signal may be based on one reference signal resource in a set of reference signal resources, such that the embedded timing error group information may be embedded in each reference signal resource in the set of reference signal resources. The embedded timing error group information may be embedded based at least in part on a scrambling identification associated with the reference signal. The reference signal may be configured with one of a plurality of scrambling identification values and each of the plurality of scrambling identification values is associated with one timing error group identification value. The embedded timing error group information may be embedded based at least in part on a cyclic shift configuration with the reference signal. The reference signal may be configured with one of a plurality of cyclic shift configurations and each of the plurality of cyclic shift configurations is associated with one timing error group identification value. The embedded timing error group information may be embedded based at least in part on a scrambling identification of the reference signal and an orthogonal sequence in the reference signal. The reference signal may be associated with a single scrambling identification value and one of a plurality of orthogonal sequences, such that a first and a second timing error group identification values may be associated with a respective positive and negative values in each resource element in the reference signal. The reference signal including the embedded timing error group information may be received via a sidelink.

An example method for configuring reference signals based on timing error group information according to the disclosure includes receiving a request for positioning information from a network server, the request including assistance data with reference signal transmission properties and timing error group configuration information, configuring reference signal resources based at least in part on the timing error group configuration information, and transmitting a positioning information response message including reference signal resource configuration information to the network server.

Implementations of such as method may include one or more of the following features. Configuring reference signal resources may include transmitting one or more reference signal resources including the timing error group configuration information to a target user equipment. The timing error group configuration information in the request for positioning information may include an indication of a number of bits to be embedded in a reference signal, such that the number of bits identifies one or more timing error group configurations. The timing error group configuration information in the request for positioning information may include an indication of a number of symbols to be used to embed an indication of one or more timing error group configurations. The timing error group configuration information in the request for positioning information may include an indication of one or more reference signal resources to be embedded with one or more timing error group configurations. The reference signal transmission properties may include at least one of a pathloss reference, spatial relation information, and synchronization signal block configuration information.

An example method for providing timing error information associated with a reference signal according to the disclosure includes determining timing error information associated with the reference signal, embedding the timing error information in the reference signal, and transmitting the reference signal including the embedded timing error information.

Implementations of such a method may include one or more of the following features. Transmitting one or more signaling messages including the timing error information. The one or more signaling messages includes a medium access control control element. The embedded timing error information may be embedded in a symbol in the reference signal. The embedded timing error information may be embedded in a group of symbols in the reference signal. The group of symbols may include non-consecutive symbols in the reference signal. The embedded timing error information may be embedded in each symbol of the reference signal. The reference signal may be based on one reference signal resource in a set of reference signal resources, such that the embedded timing error information may be embedded in each reference signal resource in the set of reference signal resources. The embedded timing error information may be embedded based at least in part on a scrambling identification in the reference signal. The reference signal may be configured with one of a plurality of scrambling identification values and each of the plurality of scrambling identification values is associated with a timing error group identification value. The embedded timing error information may be embedded based at least in part on a cyclic shift in the reference signal. The reference signal may be configured with one of a plurality of cyclic shift configurations and each of the plurality of cyclic shift configurations is associated with one timing error group identification value. The embedded timing error information may be embedded based at least in part on a scrambling identification of the reference signal and an orthogonal sequence in the reference signal. The reference signal may be associated with a single scrambling identification value and one of a plurality of orthogonal sequences, such that the embedded timing error information is one of a first and a second timing error group identification values associated with a respective positive and negative values in each resource element in the reference signal. The reference signal including the embedded timing error information may be transmitted via a sidelink.

An example method for providing reference signal and timing error information to network stations according to the disclosure includes transmitting a request for positioning information to a first station, the request including a suggested timing error group embedding scheme, receiving a positioning information response message including a timing error group embedding scheme from the first station, and transmitting one or more measurement request messages including the timing error group embedding scheme to one or more neighboring stations.

Implementations of such a method may include one or more of the following features. The method may include receiving one or more reference signal measurements from the first station and the one or more neighboring stations, the one or more reference signal measurements being based at least on part on the timing error group embedding scheme, and computing a location of a user equipment based at least in part on the one or more reference signal measurements. The one or more neighboring stations may include a transmission reception point, a user equipment, and/or a roadside unit. The suggested timing error group embedding scheme in the request for positioning information may include an indication of a number of bits to be embedded in a reference signal, wherein the number of bits identifies one or more timing error group configurations. The suggested timing error group embedding scheme in the request for positioning information may include an indication of a number of symbols to be used to embed an indication of one or more timing error group configurations. The suggested timing error group embedding scheme in the request for positioning information may include an indication of one or more reference signal resources to be embedded with one or more timing error group configurations.

An example apparatus according to the disclosure includes a memory, at least one transceiver, at least one processor communicatively coupled to the memory and the at least one transceiver, and configured to receive a reference signal including embedded timing error group information from a first station, and determine a timing group error value based at least in part on the embedded timing error group information.

An example apparatus according to the disclosure includes a memory, at least one transceiver, at least one processor communicatively coupled to the memory and the at least one transceiver, and configured to receive a request for positioning information from a network server, the request including assistance data with reference signal transmission properties and timing error group configuration information, configure reference signal resources based at least in part on the timing error group configuration information, and transmit a positioning information response message including reference signal resource configuration information to the network server.

An example apparatus according to the disclosure includes a memory, at least one transceiver, at least one processor communicatively coupled to the memory and the at least one transceiver, and configured to determine timing error information associated with a reference signal, embed the timing error information in the reference signal, and transmit the reference signal including the embedded timing error information.

An example apparatus according to the disclosure includes a memory, at least one transceiver, at least one processor communicatively coupled to the memory and the at least one transceiver, and configured to transmit a request for positioning information to a first station, the request including a suggested timing error group embedding scheme, receive a positioning information response message including a timing error group embedding scheme from the first station, and transmit one or more measurement request messages including the timing error group embedding scheme to one or more neighboring stations.

An example non-transitory processor-readable storage medium comprising processor-readable instructions configured to cause one or more processors to determine a timing error group associated with internal timing errors of a first station according to the disclosure includes code for receiving a reference signal including embedded timing error group information from a first station, and code for determining a timing group error value based at least in part on the embedded timing error group information.

An example non-transitory processor-readable storage medium comprising processor-readable instructions configured to cause one or more processors to configure reference signals based on timing error group information according to the disclosure includes code for receiving a request for positioning information from a network server, the request including assistance data with reference signal transmission properties and timing error group configuration information, code for configuring reference signal resources based at least in part on the timing error group configuration information, and code for transmitting a positioning information response message including reference signal resource configuration information to the network server.

An example non-transitory processor-readable storage medium comprising processor-readable instructions configured to cause one or more processors to provide timing error information associated with a reference signal according to the disclosure includes code for determining timing error information associated with the reference signal, code for embedding the timing error information in the reference signal, and code for transmitting the reference signal including the embedded timing error information.

An example non-transitory processor-readable storage medium comprising processor-readable instructions configured to cause one or more processors to provide reference signal and timing error information to network stations according to the disclosure includes code for transmitting a request for positioning information to a first station, the request including a suggested timing error group embedding scheme, code for receiving a positioning information response message including a timing error group embedding scheme from the first station, and code for transmitting one or more measurement request messages including the timing error group embedding scheme to one or more neighboring stations.

Items and/or techniques described herein may provide one or more of the following capabilities, as well as other capabilities not mentioned. A mobile device may be configured to exchange positioning reference signals with multiple stations. Delays in the processing of the reference signals may reduce the accuracy of position estimates based on the message exchanges. Compensation and/or calibration values for the delays may be categorized into timing error groups. Time values associated with the timing error groups may be applied to reference signal measurements to improve the accuracy of the position estimates. A mobile station may be configured to embed timing error group information in a positioning reference signal. Stations receiving the reference signals may be configured to determine timing errors based on the embedded timing group information. The accuracy of time of flight based positioning techniques may be improved. Messaging overhead may be reduced. Other capabilities may be provided and not every implementation according to the disclosure must provide any, let alone all, of the capabilities discussed.

BRIEF DESCRIPTION OF THE DRAWINGS

FIGS. 10C and 10D are example data structures for embedding timing error group information in reference signals.

DETAILED DESCRIPTION

Figure 1:
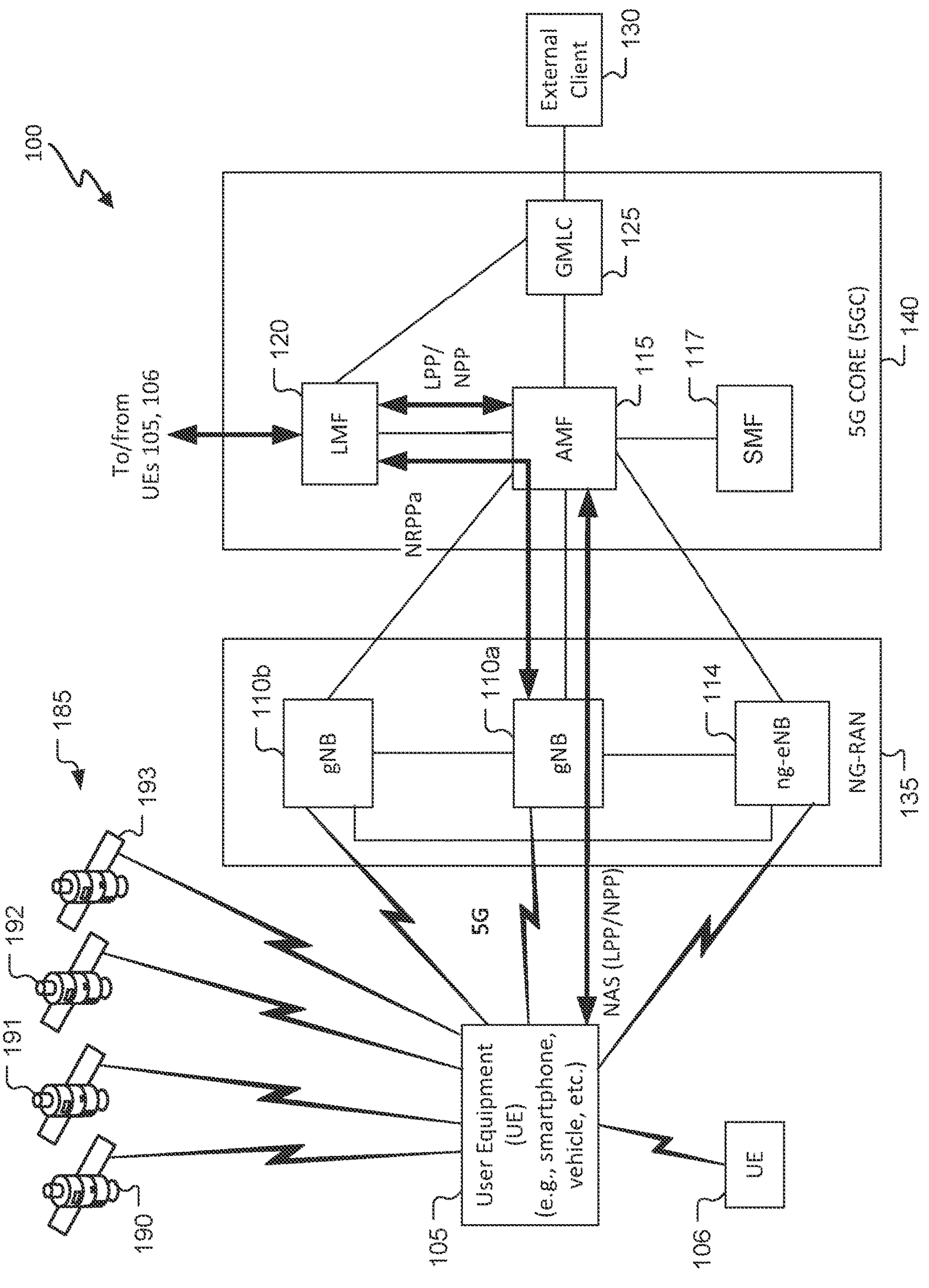
FIG. 1 is a simplified diagram of an example wireless communications system.

Techniques are discussed herein for embedding timing error group (TEG) information in reference signals. Terrestrial time-of-flight positioning techniques such as round trip timing (RTT) and time of arrival (ToA), for example, may be dependent on the accuracy of timing measurements associated with the transmission and reception of reference signals between two or more stations. Even small timing issues may result in very large errors in the corresponding positioning estimates. For example, a time measurement error as small as 100 nanoseconds can result in a localization error of 30 meters. Physical and electrical constraints in a station, such as a user equipment (UE) or a base station (e.g., a transmission/reception point (TRP)), may introduce timing errors associated with the transmission and reception of a reference signal. For example, from a signal transmission perspective, there may be a time delay from the time when the digital signal is generated at baseband to the time when the RF signal is transmitted from a Tx antenna. In terrestrial positioning applications, a station (e.g., UE, TRP, etc.) may implement an internal calibration and/or compensation of the Tx time delay for the transmission of reference signals. For example, downlink positioning reference signals (DL PRS) and/or uplink positioning reference signals (UL PRS)/sounding reference signals (SRS), may include the calibration and/or compensation of the relative time delay between different RF chains in the same station. The compensation may also consider the offset of the Tx antenna phase center to the physical antenna center. The calibration/compensation may not be perfect. The remaining Tx time delay after the calibration, or the uncalibrated Tx time delay is defined as Tx timing error.

From a signal reception perspective, there may be a time delay from a time when an RF signal arrives at an Rx antenna to the time when the signal is digitized and time-stamped at the baseband. In terrestrial positioning application, the stations (e.g., UE, TRP) may implement an internal calibration and/or compensation of the Rx time delay before the measurements that are obtained from a reference signal (e.g., DL PRS/SRS) are reported. In an example, the measurement reports may include the calibration and/or compensation of the relative time delay between different RF chains in the same station. The compensation may also possibly consider the offset of the Rx antenna phase center to the physical antenna center. The RX calibration, however, may also not be perfect. The remaining Rx time delay after the calibration, or the uncalibrated Rx time delay is defined as Rx timing error.

The timing error group (TEG) information described herein may be based on the TX and RX timing errors associated with one or more reference signal resources, such as DL PRS resources and UL PRS/SRS resources. The TEG may be associated with one or more different uplink, downlink and/or sidelink signals, and may include TX and RX timing error values within a certain margin. In an embodiment. TEG information may be embedded in a reference signal to enable the receiving station to apply the associated TX and/or RX timing errors. For example, the TEG information may be embedded in the transmitted waveform of the reference signal. In an example, TEG values may be associated with scrambling identification values, and a station may embed the appropriate scrambling ID in the waveform to indicate the TEG. In an example, TEG values may be associated with a cyclic shift in a reference signal and a station may embed the appropriate cyclic shift in the waveform to indicate the TEG. In an example, a single scrambling ID with orthogonal sequences may be embedded in the waveform to indicate a TEG. Combinations of these techniques may also be used. In an embodiment, other messaging protocols may also be used to provide the TEG information. For example, in bandwidth limited and/or range limited applications, media access control (MAC) control elements (CE) may be used to indicate a TEG group. These are examples, and other examples (of UEs and/or criteria) may be implemented.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity.

The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS).

Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110*a*, 110*b*, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®. Bluetooth®-low energy (BLE), Zigbee, etc. One or more of the BSs 110*a*, 110*b*, 114 may be configured to communicate with the UE 105 via multiple carriers. Each of the BSs 110*a*, 110*b*, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, director indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system). e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), a physical sidelink control channel (PSCCH), a sidelink shared channel (SL-SCH), a sidelink broadcast channel (SL-BCH), and other sidelink synchronization signals.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device. Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level).

Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110*a*, 110*b*, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management.

The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP.

The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-cNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
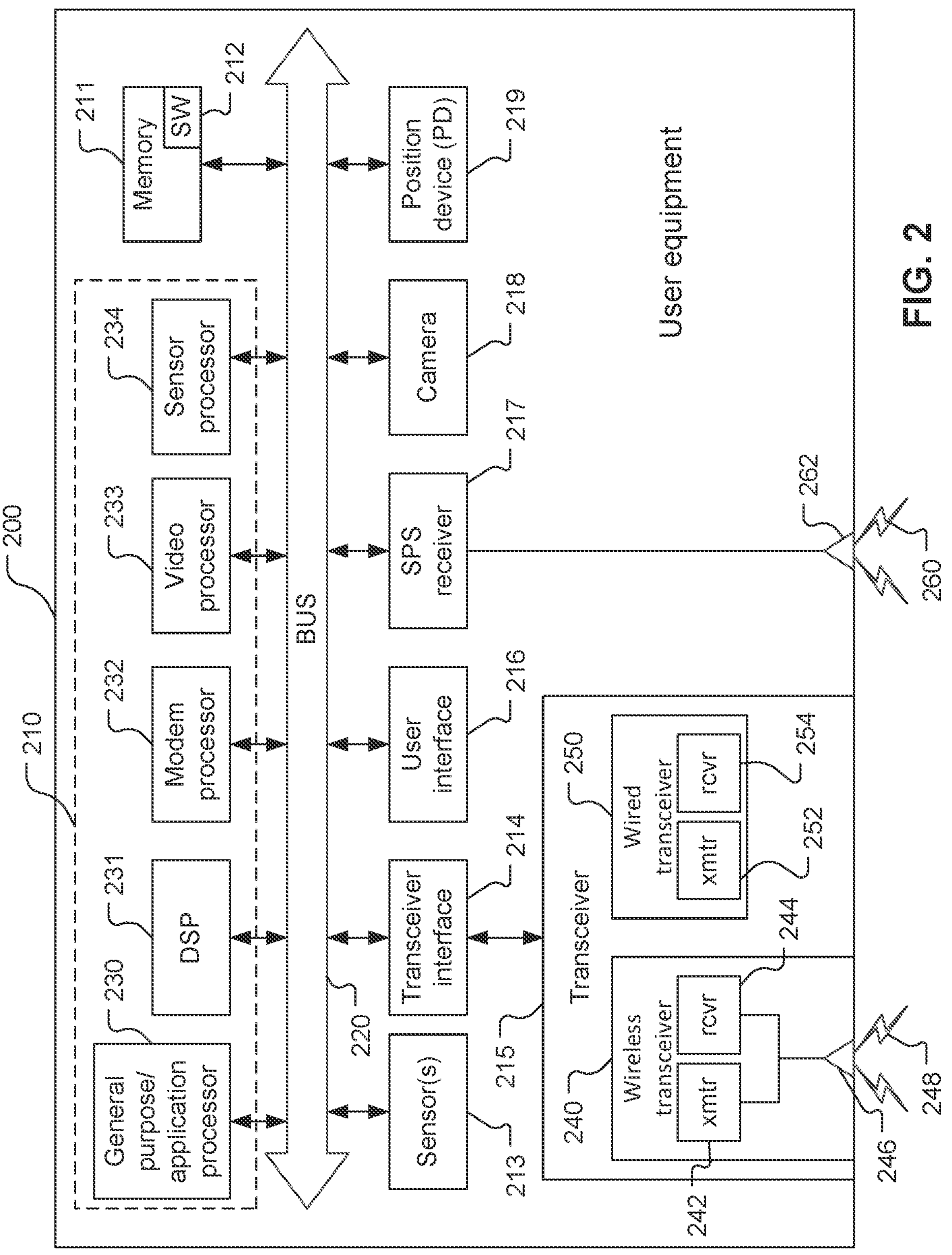
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System). CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s).

The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200.

The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Figure 3:
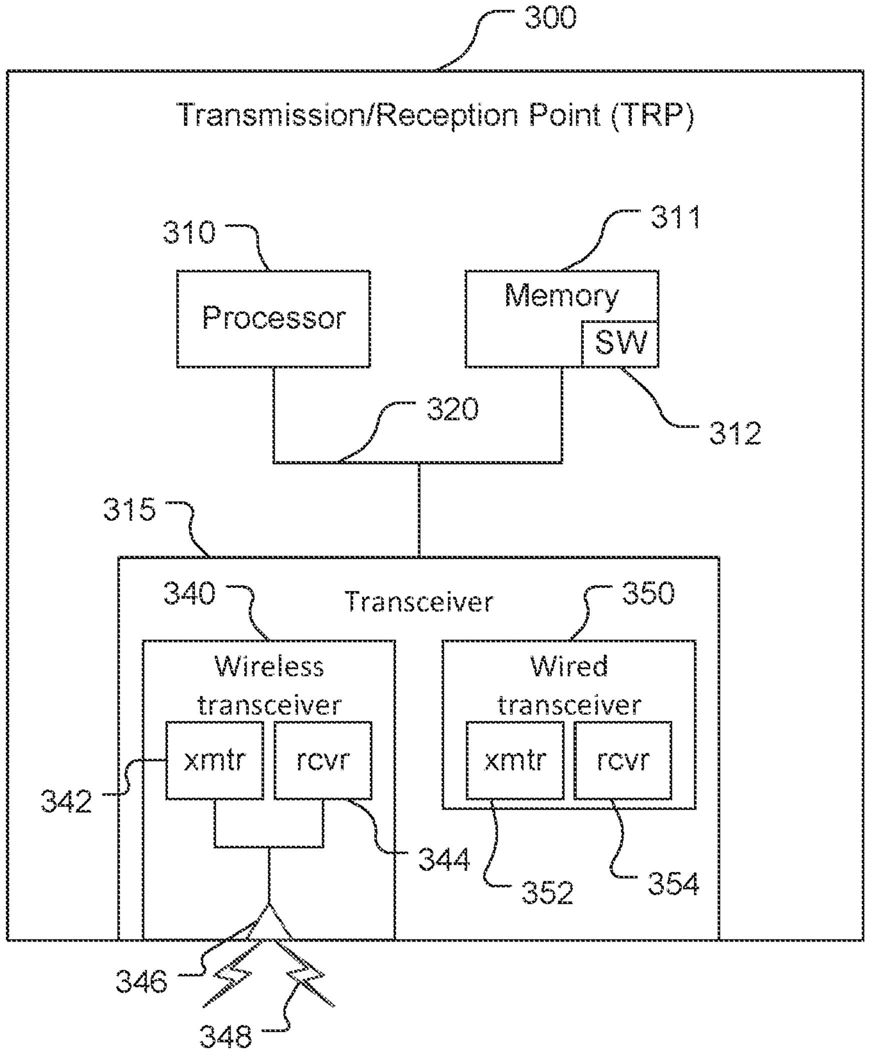
FIG. 3 is a block diagram of components of an example transmission/reception point shown in FIG. 1.

Referring also to FIG. 3, an example of a TRP 300 of the BSs 110*a*. 110*b*, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110*a*, 110*b*, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System). AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., with the network 135 to send communications to, and receive communications from, the LMF 120, for example. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
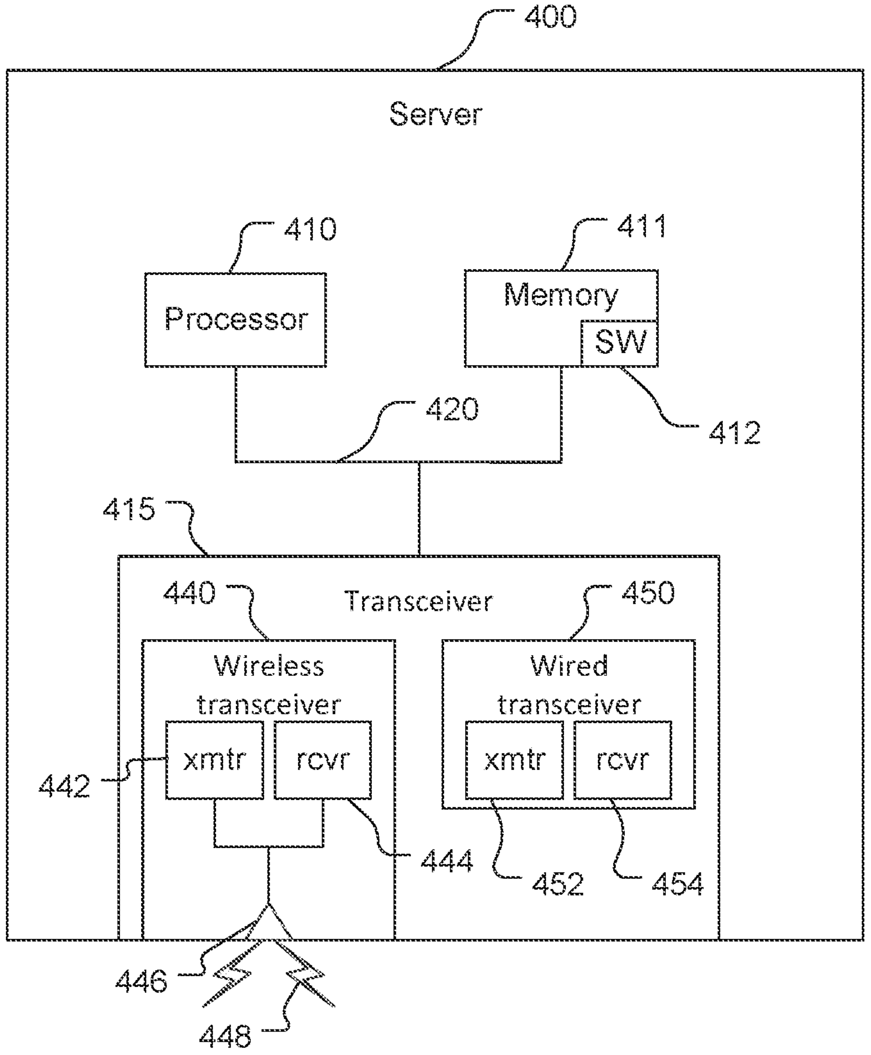
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication. e.g., with the network 135 to send communications to, and receive communications from, the TRP 300, for example. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability. e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal.

The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS. SRS), may refer to one reference signal or more than one reference signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element).

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. Tc TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT). In an embodiment, sidelink-based positioning method may also be used. For example, RTT, ToA, and other time-of-flight techniques may be based on reference signals (e.g., SRS) transmitted between UEs.

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
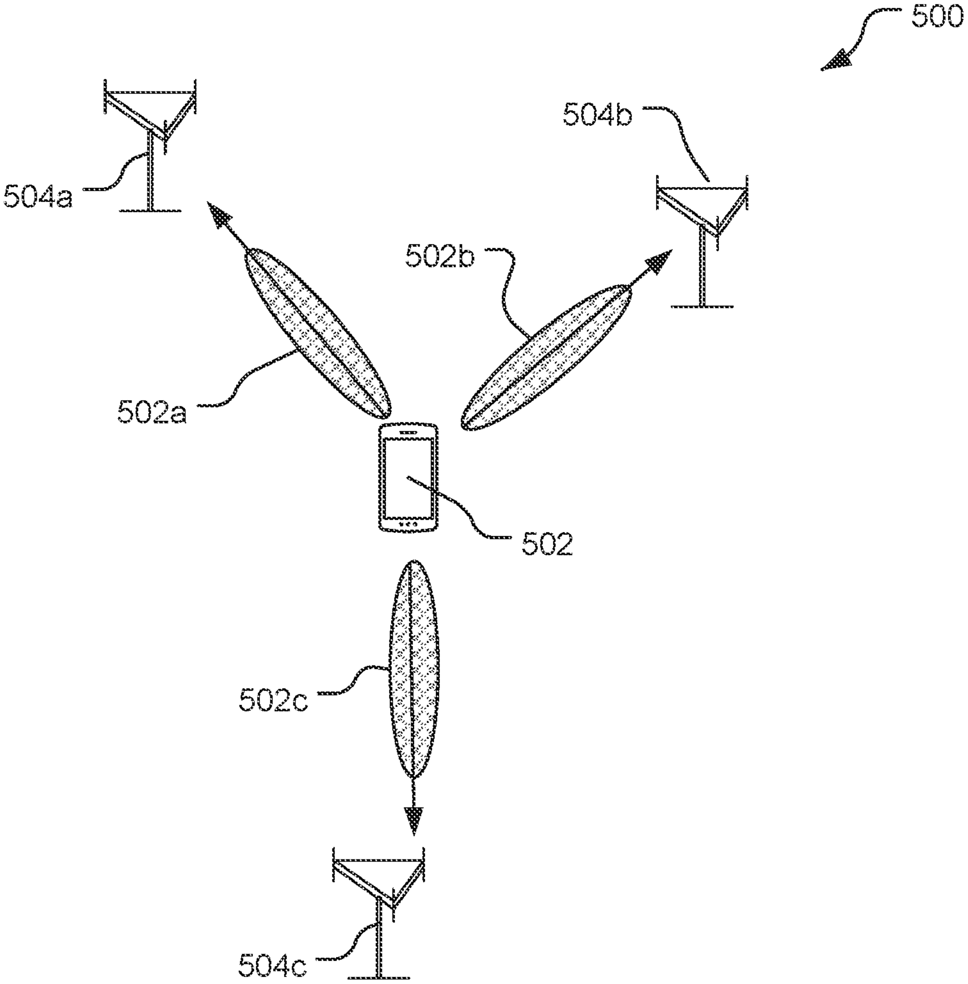
FIG. 5 is a conceptual diagram of example uplink positioning reference signals.

Referring to FIG. 5, a conceptual diagram 500 of uplink positioning reference signals is shown. The diagram 500 includes a UE 502 and a plurality of base stations including a first base station 504*a*, a second base station 504*b*, and a third base station 504*c*. The UE 502 may have some or all of the components of the UE 200, and the UE 200 may be an example of the UE 502. Each of the base stations 504*a-c* may have some or all of the components of the TRP 300, and the TRP 300 may be an example of one or more of the base stations 504*a-c*. In operation, the UE 502 may be configured to transmit one or more reference signals such as a first reference signal 502*a*, a second reference signal 502*b*, and a third reference signal 502*c*. The reference signals 502*a-c* may be UL PRS or SRS for positioning signals including embedded TEG information, which may be received by one or more of the base stations 504*a-c*. While the diagram 500 depicts three reference signals, few or more reference signals may be transmitted by the UE 502 and detected by one or more neighboring stations. In an example, the reference signals 502*a-c* may be SRS for positioning signals. In general, SRS for positioning signals in NR may be UE configured reference signals transmitted by a UE and used for the purpose of determining a range between the UE and one or more receiving stations such as the base stations 504*a-c*, or another UE (e.g., via a sidelink transmitted SRS). In an embodiment, the SRS signals may be used for sounding an uplink radio channel. SRS may also be used for the purpose of sounding an uplink radio channel. The reference signals 502*a-c* may be SRS for positioning resources included in a SRS for positioning resource set. The SRS for positioning resource set may be used to enable activation for semi-persistent SRS and aperiodic SRS (e.g., via DCI triggering), and multiple SRS resources for positioning may be activated simultaneously.

Figure 6:
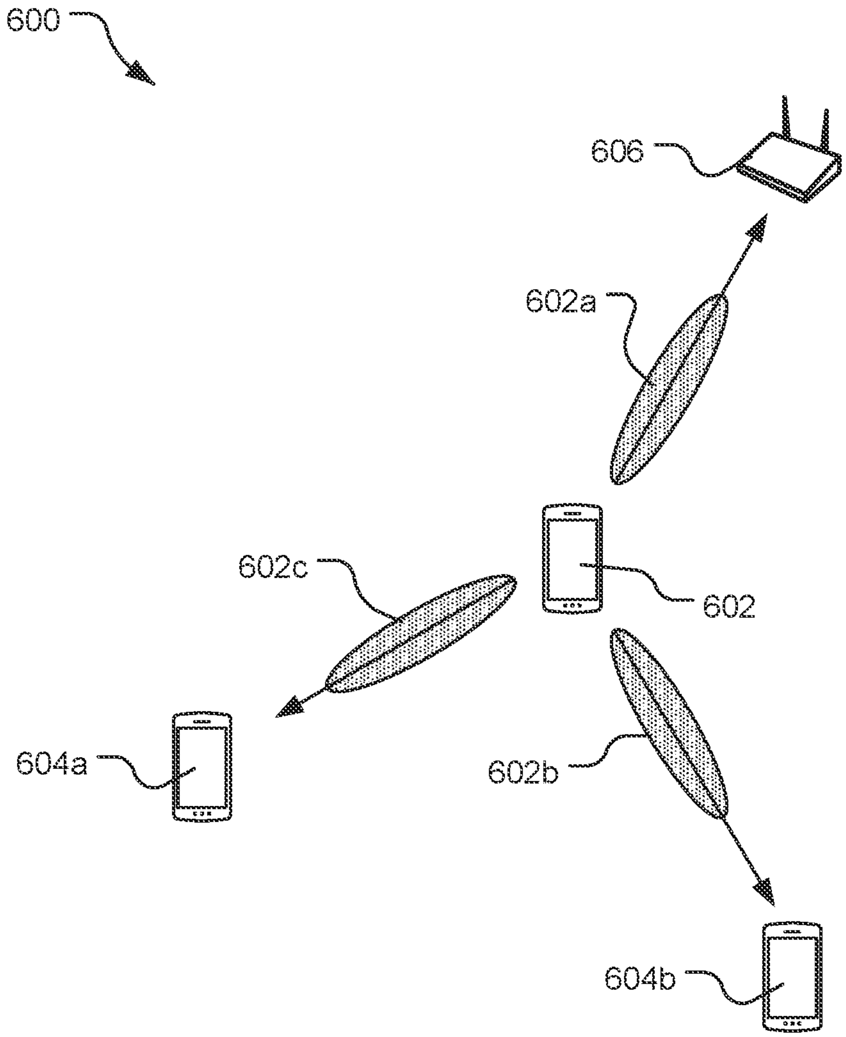
FIG. 6 is a conceptual diagram of example sidelink positioning reference signals.

Referring to FIG. 6, a conceptual diagram 600 of sidelink positioning reference signals is shown. The diagram 600 includes a target UE 602 and a plurality of neighboring stations including a first neighbor UE 604*a*, a second neighbor UE 604*b*, and a third neighbor station 606. Each of the target UE 602 and the neighbor UEs 604*a-b* may have some or all of the components of the UE 200, and the UE 200 may be an example of the target UE 602 and the neighbor UEs 604*a-b*. The station 606 may have some or all of the components of the TRP 300, and the TRP 300 may be an example of the station 606. In an embodiment, the station 606 may be a roadside unit (RSU) in a V2X network. In operation, the target UE 602 may be configured to transmit one or more sidelink reference signals 602*a-c* via a sidelink channel such as the PSSCH, PSCCH, PSBCH or other D2D interface. In an example, the reference signals may utilize a D2D interface such as the PC5 interface. The reference signals 602*a-c* may be UL PRS or SRS for positioning signals including embedded TEG information which may be received by one or more of the neighboring UEs 604*a-b*, or the station 606. While the diagram 600 depicts three reference signals, few or more reference signals may be transmitted by the target UE 602 and detected by one or more neighboring UEs and stations. In an embodiment, the sidelink reference signals 602*a-c* may be SRS for positioning resources and may be included in a SRS for positioning resource set.

Figure 7:
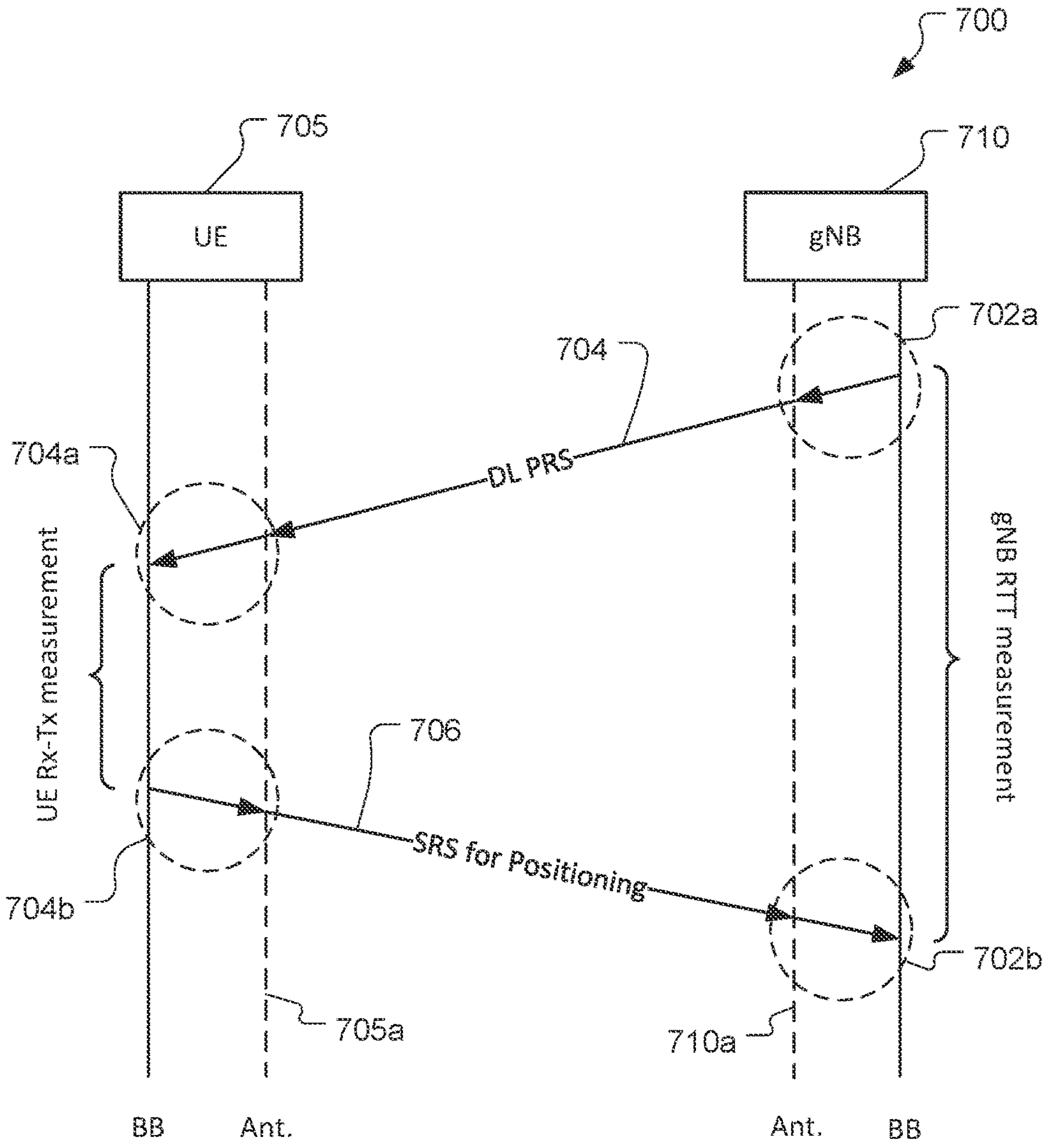
FIG. 7 is a message flow diagram of example impacts of group delay errors within wireless transceivers.

Referring to FIG. 7, a conceptual diagram 700 of example impacts of group delay errors within wireless transceivers are shown. The diagram 700 depicts an example RTT exchange used for positioning a client device. For example, a target UE 705, such as the UE 200, and a base station 710, such as a gNB 110*a*, may be configured to exchange positioning reference signals such as a downlink (DL) PRS 704 and an SRS for positioning signal 706 (which may also be an UL PRS). The target UE 705 may have one or more antennas 705*a* and associated base band processing components. Similarly, the base station 710 may have one or more antennas 710*a* and base band processing components. The respective internal configurations of the target UE 705 and the base station 710 may cause delay times associated with the transmission and reception of PRS signals. In general, a group delay is a transit time of a signal through a device versus frequency. For example, a $BS_{TX}$ group delay 702*a* represents the difference in time the base station 710 records the transmission of the DL PRS 704 and the time the signal leaves the antenna 710*a*. A $BS_{RX}$ group delay 702*b* represents the difference in time the SRS for positioning signal 706 arrives at the antenna 710*a* and the time the processors in the base station 710 receive an indication of the SRS for positioning signal 706. The target UE 705 has similar group delays such as the $UE_{RX}$ group delay 704*a* and the $UE_{TX}$ group delay 704*b*. The group delays associated with the network stations may create a bottleneck for terrestrial based positioning because the resulting time differences lead to inaccurate position estimates. For example, a 10 nanosecond group delay error equates to approximately a 3 meter error in the position estimate. Different frequencies may have different group delay values in a transceiver, thus different PRS and SRS resources may be associated with different TEGs. Other electrical and physical features may also impact the group delay. For example, different antenna modules may cause different levels of delay and signals utilizing the different arrays may be associated with different TEGs. Other variations of signal and/or beam parameters may also be used to associate a signal with a TEG.

Figure 8:
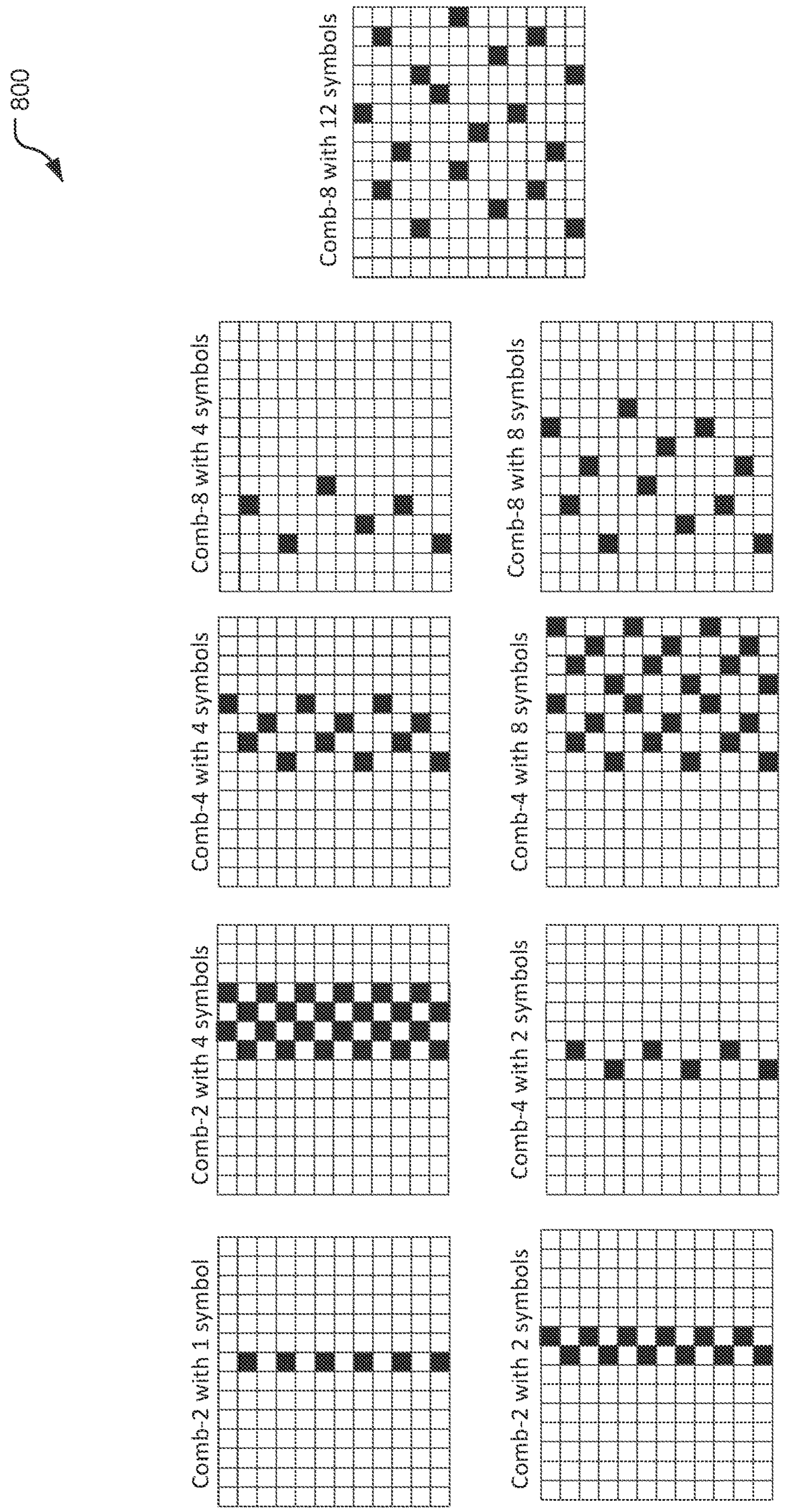
FIG. 8 are example reference signal time and frequency domain patterns.

Referring to FIG. 8, example time and frequency domain patterns 800 for reference signal transmissions are shown. The time and frequency domain patterns in FIG. 8 are examples and not limitations and include a comb-2 with 1 symbols format, a comb-2 with 2 symbols format, a comb-2 with 4 symbols format, a comb-4 with 2 symbols format, a comb-4 with 4 symbols format, a comb-4 with 8 symbols format, a comb-8 with 4 symbols format, a comb-8 with 8 symbols format, and a comb-8 with 12 symbols format. In general, in NR systems, the time duration of a SRS for positioning resource may be one, two, or four consecutive OFDM symbols within a slot. The transmission comb spacing may occupy resource elements (REs) of a frequency domain comb structure, where the comb spacing is 2, 4, or 8 REs. The symbols may be based on a reference signal resource, such as an UL-PRS/SRS resource. In an embodiment, the reference signals in FIG. 8 may be periodic, semipersistent or aperiodic transmission of SRS for positioning defined for gNB UL RTOA, UL SRS-RSRP, UL-AoA, gNB Rx-Tx time difference measurements to facilitate support of UL TDOA, UL AoA and multi-RTT positioning methods (e.g., 3GPP TS 38.305). The reference signals in FIG. 8 may also be used for sidelink SRS between stations (e.g., utilizing a sidelink channel). The reference signals may be configured to include embedded TEG information based on the group delay associated with the reference signal. For example, the TEG information may be embedded in each symbol separately in an SRS resource. The TEG information may be embedded in a group of symbols in an SRS resource, or it may be embedded in the whole SRS resource, or in all the SRS resources in an SRS resource set. The embedded TEG information may enable a receiving station (e.g., gNB, UE, RSU) to apply an associated group delay to the transmitted signal. For example, referring to FIG. 7, the SRS for positioning signal 706 may include embedded TEG information associated with the $UE_{TX}$ group delay 704*b*. That is, the receiving station obtains the appropriate TEG information directly when the it receives the reference signal. The embedded TEG information avoids the delay associated with propagating the TEG information via other messaging protocols, such as using LPP to the LMF, which must then be sent to the receiving stations. Embedding TEG information in the reference signals directly may reduce latency in positioning a target UE and may reduce network messaging overhead.

Figure 9:
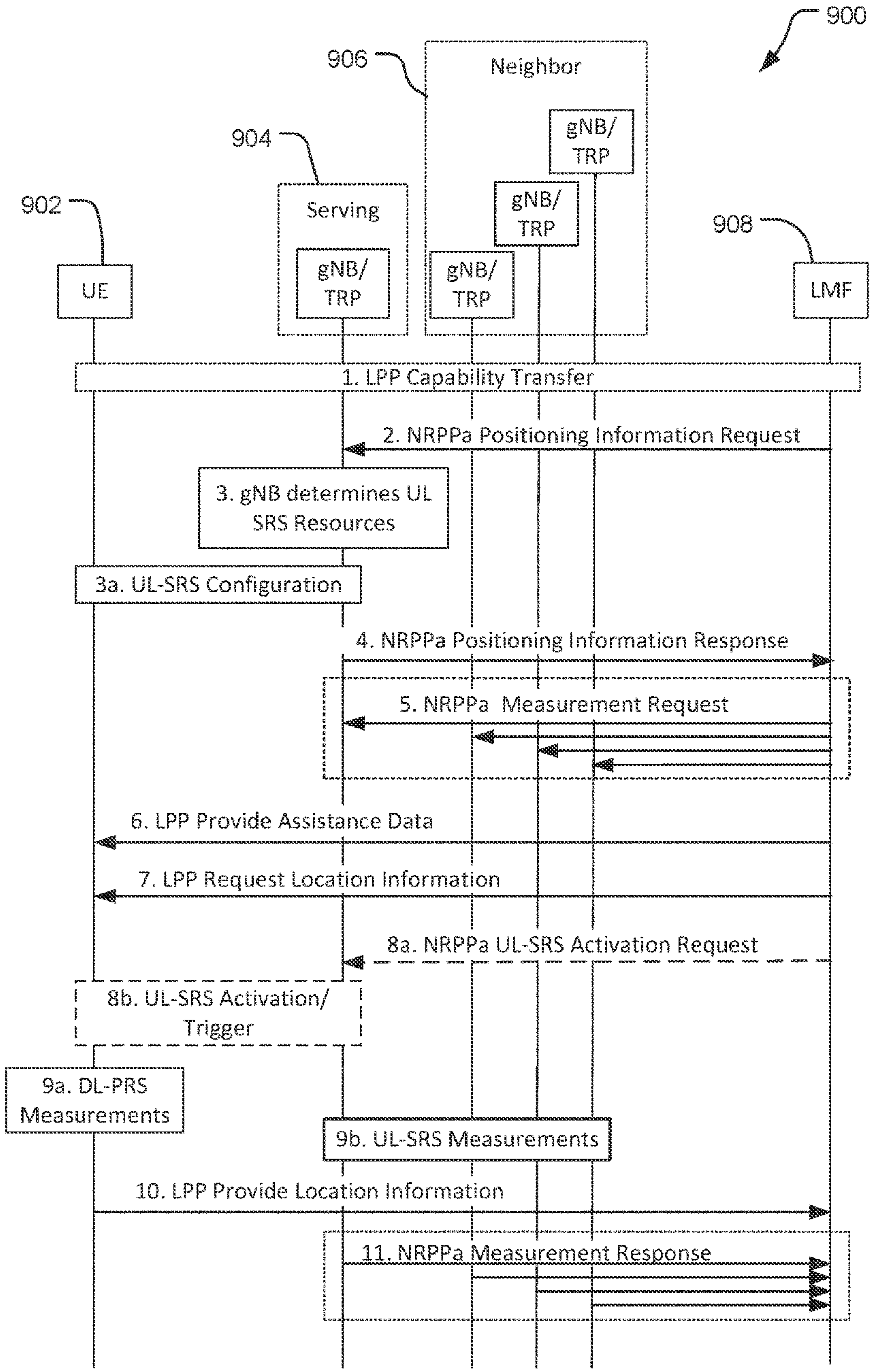
FIG. 9 is an example message flow for a multiple round trip time positioning procedure.

For example, referring to FIG. 9, an example message flow 900 for a multi-RTT positioning process is shown. The flow 900 is an example only, as stages may be added, rearranged, and/or removed. The message flow 900 may include a target UE 902, a serving station 904, a plurality of neighboring stations 906, and a server 908. The UE 200 may be an example of the target UE 902, a TRP 300 such as the gNB 110*a* may be an example of the serving station 904, and a server 400 such as the LMF 120 may be an example of the server 908. The plurality of neighboring stations 906 may include base stations such as the gNB 110*b*, the eNB 114, or other stations such as neighboring UEs (e.g., configured for sidelink or other D2D communications). At stage 1, the server 908 may request positioning capabilities from the target UE 902 via one or more LPP messages. In an example, the target UE 902 may indicate the capability to embed TEG information in reference signals such as UL-PRS, SRS for positioning, and sidelink SRS. In an embodiment, the target UE 902 may be a NR-Light UE, or other limited capability UE, and may have a limited bandwidth with SRS transmissions. Such a limited capability UE may utilize alternative reporting for reporting TEG information. For example, RRC messaging, MAC-CE or DCI messaging may be used to propagate TEG information. At stage 2, the server 908 may request UL-SRS configuration information for the target UE 902 from the serving station 904. The server 908 may provide assistance data to the serving station 904 including reference signal transmission properties such as a pathloss reference, spatial relation information, Synchronization Signal Block (SSB) configuration information, or other information required by the serving station 904 to determine a range to the target UE 902. In an example, the serving station 904 may provide suggested TEG embedding information based on the capabilities of the target UE 902 (e.g., as determined at stage 1). For example, the server 908 may request the serving station 904 to configure the target UE 902 with a specific TEG embedding schema (e.g., how many bits should the target UE 902 embed, how many symbols should be used, which SRS resources should have TEG information embedded). At stage 3, the serving station 904 is configured to determine the resources available for UL-SRS and configured the target UE 902 with the UL-SRS resource sets. In an example, the serving station 904 may also determine a schema for embedding TEG information in the UL-SRS resources. The schema may be based on the suggested TEG embedding information received from the server 908 at stage 2, or based on other operational requirements (e.g., band conditions, throughput, etc.).

Figure 10A:
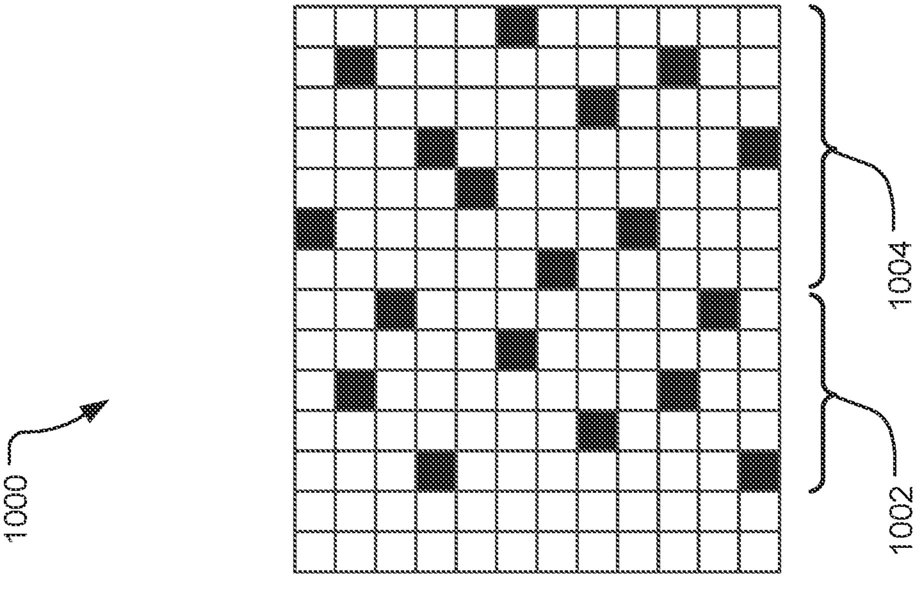
FIGS. 10A and 10B are example reference signal time and frequency domain patterns with embedded timing error group information.
Figure 10B:
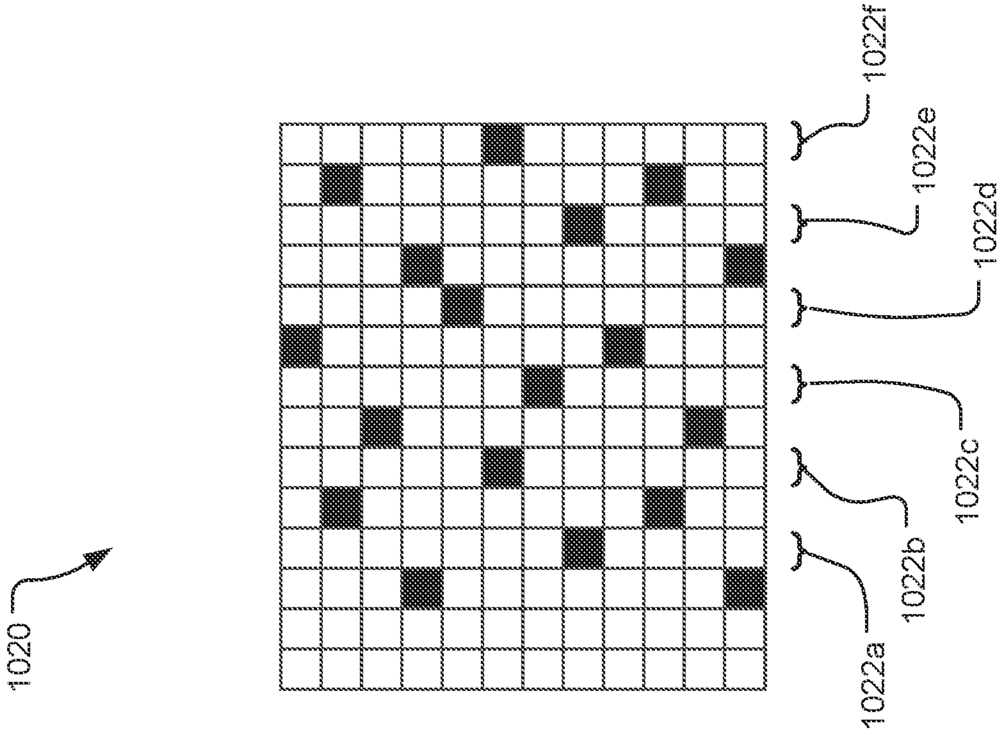

The embedding scheme may include embedding TEG information in a group of symbols in an SRS resource, in the whole SRS resource, and/or in all the SRS resources in an SRS resource set. Referring to FIGS. 10A and 10B, for example, a first SRS resource 1000 may include multiple symbols, only a first subset of symbols 1004 have the TEG information embedded and the remaining symbols 1002 do not have TEG information embedded. A second SRS resource 1020 may include embedded TEG information in a non-consecutive subset of symbols 1022*a-f*, and the intervening symbols will not have embedded TEG information. In an example, the first received symbols may be used as pilots to help with the estimation of the embedded pilot in a second subset of the symbols. In an example, the schema may embed TEG information based on the scrambling identifications and/or the cyclic shifts for the SRS resources. For example, referring to FIGS. 10C and 10D, the serving station 904 and the target UE 902 may be configured with one or more data structures such as a first data structure 1030 configured to associate scramble ID values 1032 with TEG group ID values 1034, and/or a second data structure 1040 configured to associate a cyclic shift value 1042 with a TEG group ID value 1044. For example, the serving station 904 may configure X scrambling IDs for the SRS, such that the Xth scrambling ID corresponds to the Xth TEG group ID. The serving station 904 may configure X cyclic shifts for the SRS, such that the Xth cyclic shift corresponds to the Xth TEG group. In an example, the serving station 904 may utilize a single scrambling ID with X orthogonal sequences. For example, two TEG group IDs could be configured based on the transmission of either the positive or the negative at each RE. Other combinations of embedding schemes may also be used.

At stage 3*a*, the target UE 902 may receive SRS resource configuration information from the serving station 904. The information may indicate the TEG embedding schema, including scrambling ID and/or cyclic shift data structures, and may indicate which part of the SRS resource may be used to embed the TEG information. In an example, the configuration information may also indicate which part of the SRS resource may be used with a legacy/constant SRS waveform and thus will not include embedded TEG information. At stage 4, the serving station 904 may provide the UL-SRS configuration information, including the embedded TEG schema information to the server 908. At stage 5, the server 908 may select candidate stations (e.g., neighboring stations 906 and the serving station 904) and provide the UL-SRS configuration information, including the embedded TEG schema information, to the candidate stations. The message includes the information to assist the candidate stations in performing the UL measurements. In an example, the candidate stations may utilize the configuration information to determine the TEG group ID based on the TEG information embedded in the received UL reference signal.

At stage 6, the server 908 may send a LPP provide assistance data message to the target UE 902. The message may include assistance data to enable the UE to perform DL measurements. At stage 7, the server 908 may send a LPP request location information message to the request multi-RTT measurements. At stage 8*a*, for semi-persistent or aperiodic UL-SRS, the server 908 may request the serving station 904 to activate/trigger the UL-SRS in the target UE 902 at stage 8*b*. The target UE 902 may transmit one or more SRS resources including the embedded TEG information based on the SRS resource configuration information provided at stage 3*a*. In an embodiment, the target UE 902 may embed TEG information for only a subset of SRS resources. For example, if an SRS resource is intended for a far-away station, the geometry may be insufficient for decoding embedded TEG information. In such an example, the TEG information may be reported via an alternative path, such as via MAC-CE messaging through the serving station 904 and then to the server 908 via NRPPa messaging. Other alternative paths may also be used to provide TEG information to stations which may not, or cannot, decode the embedded TEG information. At stage 9*a*, the target UE 902 may measure DL-PRS transmitted by the serving station 904 and/or the neighboring stations 906 and report the DL measurements to the server 908 at stage 10. At stage 9*b*, the serving station 904 and/or one or more of the neighboring stations 906 may measure the UL-SRS transmissions from the target UE 902. The stations 904, 906 may also decode and apply a TEG group delay value based on the embedded TEG information in the UL-SRS signals. At stage 11, each station 904, 906 may report the UL-SRS measurements to the server 908. The UL-SRS measurements may be adjusted based on the TEG group delay information, or the stations 904, 906 may report the TEG information to the server 908 and the server 908 may apply the corresponding TEG group delay information. The server 908 may be configured to determine the RTTs from the target UE 902 and for each of the stations 904, 906 for which corresponding UL and DL measurements were provided at stages 10 and 11 and may calculate the position of the target UE 902.

Figure 11:
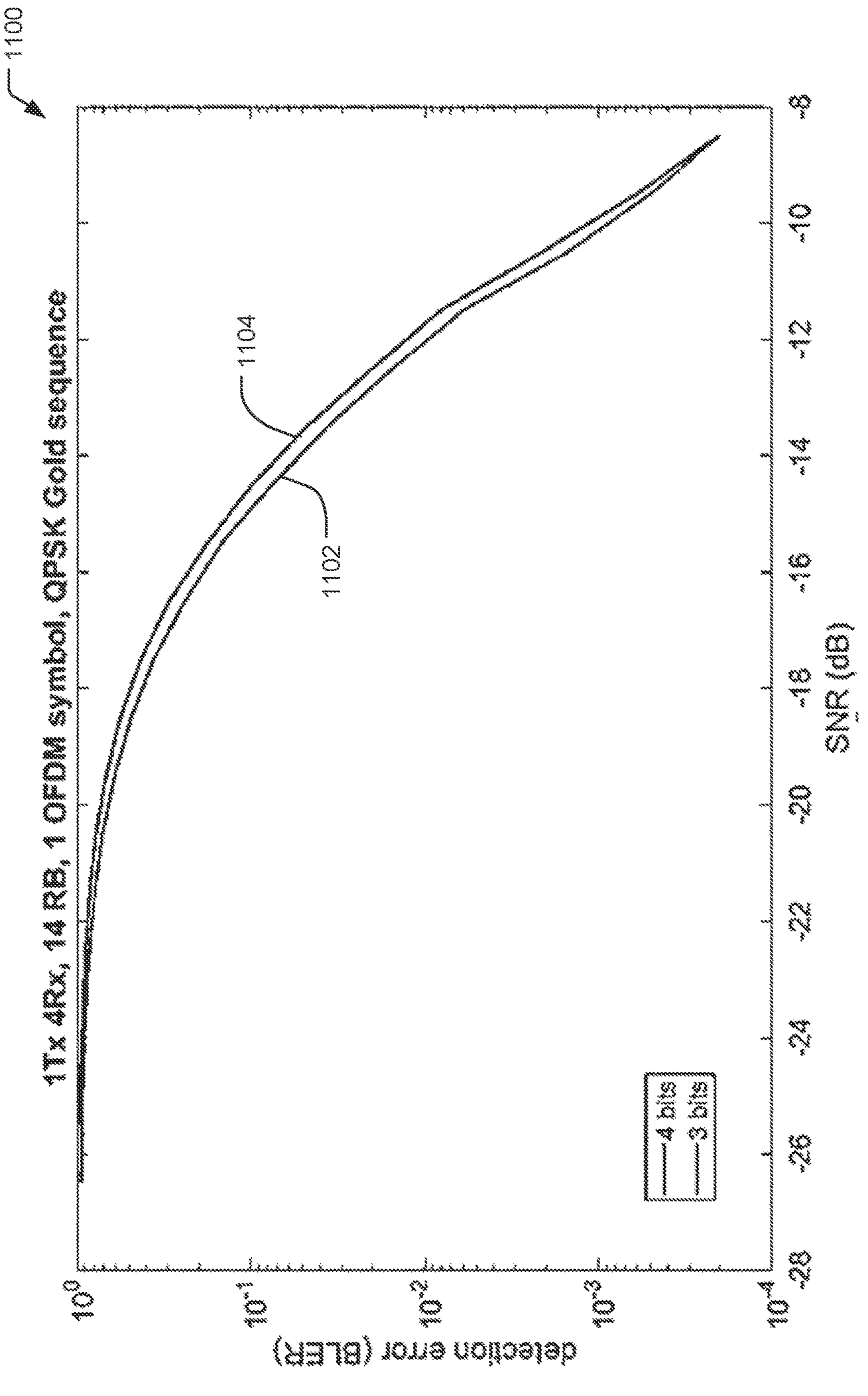
FIG. 11 is a graph of example detection errors in orthogonal frequency-division multiplexing signals.

Referring to FIG. 11, a graph 1100 of example detection errors in orthogonal frequency-division multiplexing signals is shown. The graph 1100 shows the evaluation of results of a receiver performance at low SNR when a OFDM symbol is embedded with 3 and 4 bits of data. From the evaluation, there is a slight performance degradation between a 3 bit results curve 1102 and a 4 bit results curve 1104. The graph 1100 indicates that in an embodiment, the TEG information may be embedded in an SRS for positioning resource with 3 bits (e.g., eight TEG IDs) or 4 bits (e.g., 16 TEG IDs), and decoded at low SNR values.

Figure 12:
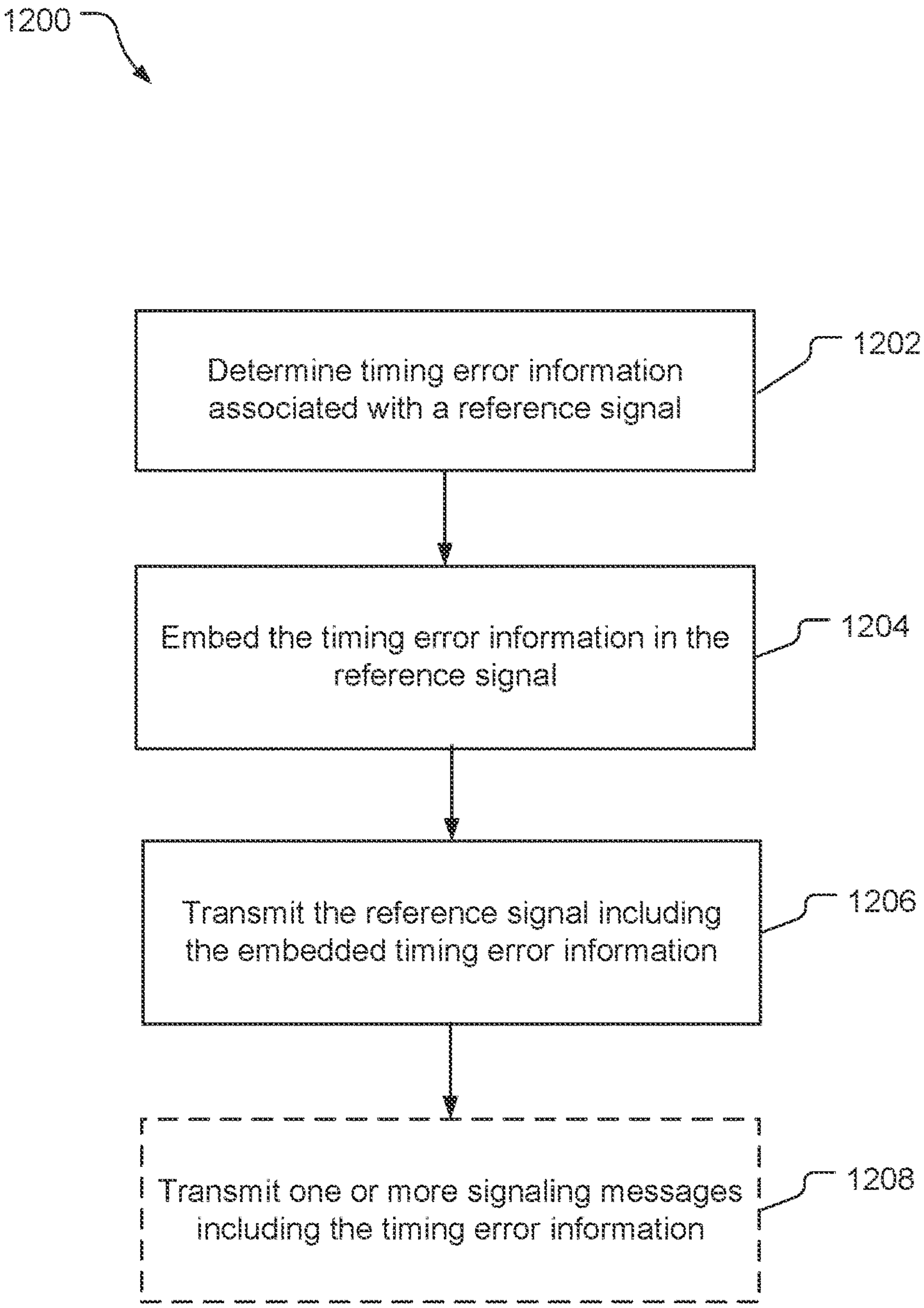
FIG. 12 is a block flow diagram of a method for providing timing error information associated with a reference signal.

Referring to FIG. 12, with further reference to FIGS. 1-11, a method 1200 for providing timing error information associated with a reference signal includes the stages shown. The method 1200 is, however, an example only and not limiting. The method 1200 may be altered, e.g., by having stages added, removed, rearranged, combined, performed concurrently, and/or having single stages split into multiple stages. For example, transmitting signaling messages at stage 1208 is optional.

At stage 1202, the method includes determining timing error information associated with a reference signal. The UE 200, including the processor 230, may be a means for determining timing error information. In an embodiment, referring to FIG. 9, the target UE 902 may receive reference signal configuration information, including timing error information such as a TEG embedding schema from the serving station 904. The TEG embedding schema may indicate how many bits should the target UE 902 embed, how many symbols should be used, and which reference signals should have TEG information embedded. The embedding schema may include one or more data structures to associate the TEG information with a scrambling ID, cyclic shift configuration, or other orthogonal sequences. In an example, the TEG embedding schema may indicate a first subset of SRS resources which will include embedded TEG information, and a second subset of SRS resources which will not include embedded TEG information. In an embodiment, the TEG embedding schema may include a bandwidth limit such that SRS resources utilizing a limited bandwidth (e.g., below a threshold bandwidth) may not include embedded TEG information. In an embodiment, a target UE may be configured to receive a TEG embedding schema via sidelink from a neighboring UE. For example, the neighboring UE may receive a TEG schema from a serving station, and then relay the TEG schema via sidelink to a target UE. In such a relay operation, the neighboring stations may be configured (e.g., via the LMF) to receive and decode SRS transmitted from the target UE.

At stage 1204, the method includes embedding the timing error information in the reference signal. The UE 200, including the processor 230, may be a means for embedding the timing error information. In an embodiment, the UE 200 may be configured to embed TEG information in a group of symbols in an reference signal resource, in the whole reference signal resource, and/or in all the reference signal resources in a reference signal resource set. Referring to FIGS. 10A and 10B, for example, a reference signal may include multiple symbols with a first subset of symbols 1004 including embedded TEG information. In an example, the reference signal may include embedded TEG information in a non-consecutive subset of symbols 1022*a-f*. Other ODFM numerologies may also be used to embed the timing error information in a reference signal, such as a SRS for positioning signal. In an embodiment, the UE 200 may be configure to embed the timing error information based on one or more data structures associated with TEG information. For example, the UE 200 may configure particular scrambling IDs and/or cyclic shifts for the reference signals, such that the particular scrambling IDs and cyclic shifts are associated with different TEG group IDs. In an example, the UE 200 may utilize a single scrambling ID with one or more orthogonal sequences. Other combinations of embedding schemes may also be used.

At stage 1206, the method includes transmitting the reference signal including the embedded timing error information. The UE 200, including the processor 230 and the wireless transceiver 240, may be a means for transmitting the reference signal. In an example, the reference signal may be a SRS for positioning signal and may utilize one of the OFDM time and frequency domain patterns such as depicted in FIG. 8. In an embodiment, the reference signals may be transmitted via a sidelink (e.g., sidelink SRS). In an embodiment, the UE 200 may embed TEG information for only a subset of the transmitted reference signals. For example, if a reference signal is intended for a far-away station, the geometry may be insufficient for decoding embedded TEG information.

At stage 1208, the method may optionally include transmitting one or more signaling messages including the timing error information. The UE 200, including the processor 230 and the wireless transceiver 240, may be a means for transmitting the signaling messages. The UE 200 may be configured to transmit one or more reference signals which do not include the embedded timing error information. For example, the UE 200 may be configured to report the timing error information via an alternative path, such as via MAC-CE messaging through the serving station 904 and then to the server 908 via NRPPa messaging. Other alternative paths may also be used to provide timing error information to stations which may not, or cannot, decode embedded timing error information.

Figure 13:
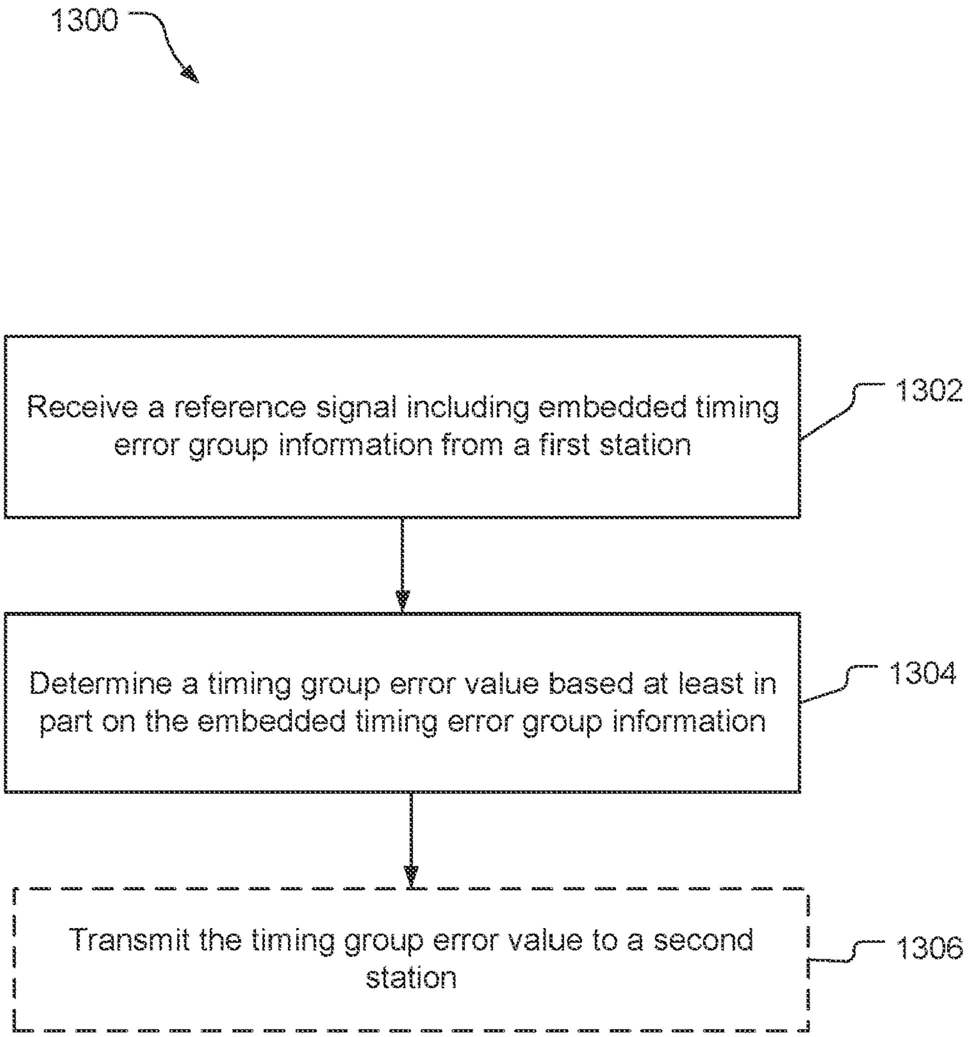
FIG. 13 is a block flow diagram of a method for determining a timing error group associated with internal timing errors of a station.

Referring to FIG. 13, with further reference to FIGS. 1-11, a method 1300 for determining a timing error group associated with internal timing errors of a station includes the stages shown. The method 1300 is, however, an example only and not limiting. The method 1300 may be altered, e.g., by having stages added, removed, rearranged, combined, performed concurrently, and/or having single stages split into multiple stages.

At stage 1302, the method includes receiving a reference signal including embedded timing error group information from a first station. A TRP 300, such as the gNB 110*a*, including a processor 310 and a wireless transceiver 340, may be a means for receiving the reference signal. In an embodiment, referring to FIG. 9, a target UE 902 may be configured to transmit one or more reference signals such as SRS for positioning at stage 8*b*. One or more stations 904, 906 may be configured to receive the reference signal. In an embodiment, the target UE 902 may be configured to embed TEG information in a group of symbols in a reference signal resource, in the whole reference signal resource, and/or in all the reference signal resources in a reference signal resource set. The reference signal may include multiple symbols with a first subset of symbols including embedded TEG information. The reference signal may include embedded TEG information in a non-consecutive subset of symbols. Other ODFM numerologies may also be used to embed the timing error group information in the reference signal. In an embodiment, the target UE 902 may be configure to embed the timing error group information based on one or more data structures associated with TEG information. For example, the embedding may be based on particular scrambling IDs and/or cyclic shifts for the reference signals, such that the particular scrambling IDs and cyclic shifts are associated with different TEG group IDs. In an example, the target UE 902 may utilize a single scrambling ID with one or more orthogonal sequences. Other combinations of embedding schemes may also be used.

At stage 1304, the method includes determining a timing group error value based at least in part on the embedded timing error group information. The TRP 300, including the processor 310, may be a means for determining the timing group error value. In an embodiment, the reference signals transmitted by the target UE 902 may be associated with one or more group delays. For example, the reference signal may be associated with a group delay such as the $UE_{RX}$ group delay 704*a* and the $UE_{TX}$ group delay 704*b* depicted in FIG. 7. Different reference signals may be associated with different timing group error values. In an embodiment, the timing group error value may be a time value and the embedded timing error group information may be a group ID value. The TRP 300 may include one or more data structures to correlate a TEG group ID with the corresponding delay time (i.e., the timing group error value). For example, a UE RxTx TEG may be associated with one or more UE Rx-Tx time difference measurements, and one or more UL SRS resources for the positioning purpose, which may have 'Rx timing errors+Tx timing errors' within a certain margin. In general, different frequencies and different transmit chains may have different group delay values in a transceiver, thus different reference signals may be associated with different TEG IDs.

At stage 1306, the method optionally includes transmitting the timing group error value to a second station. The TRP 300, including the processor 310 and the transceiver 315, may be a means for transmitting the timing group error value. In an example, the TRP 300 may be configured to apply the timing group error value (e.g., a time value) to measurements associated with the reference signal (e.g., UE Rx-Tx time difference measurements), and provide the measurements in one or more NRPPa measurement responses. In an example, the TRP 300 may be configured to provide timing group error value (i.e., the time value) or the timing error group information (e.g., the TEG ID) in one or more NRPPa measurement responses. In a sidelink use case, such as depicted in FIG. 6, a neighbor UE 604*a* or a neighbor station 606 may be configured to receive the reference signal at stage 1302, determine the error group value at stage 1304, and transmit the timing group error value via a sidelink radio access technology. For example, the reference signal and reporting messages may utilize one or more sidelink channels such as the PSSCH, PSCCH, PSBCH or other D2D interfaces.

Figure 14:
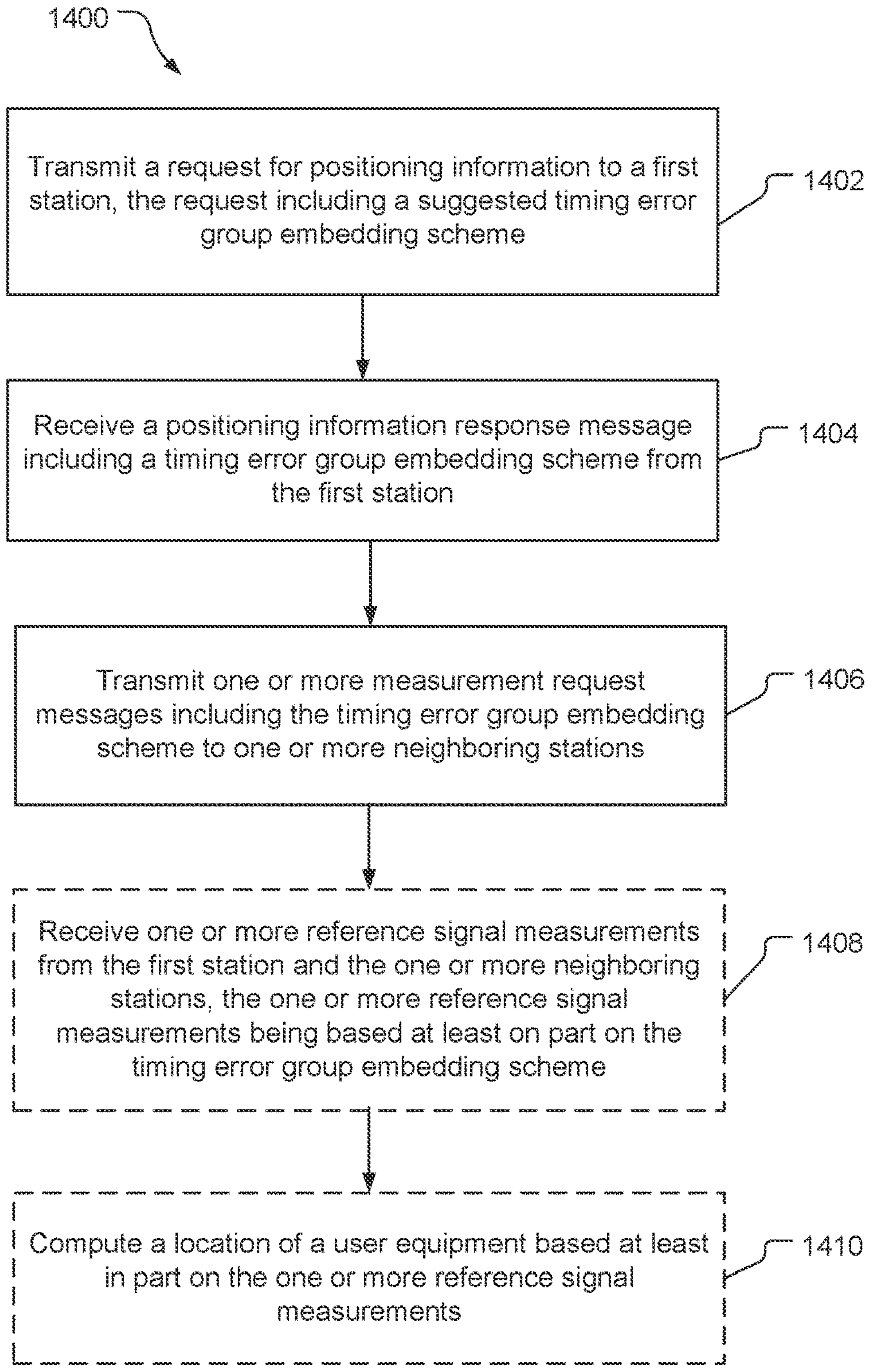
FIG. 14 is a block flow diagram of a method for providing reference signal and timing error information to network stations.

Referring to FIG. 14, with further reference to FIGS. 1-11, a method 1400 for providing reference signal and timing error information to network stations includes the stages shown. The method 1400 is, however, an example only and not limiting. The method 1400 may be altered, e.g., by having stages added, removed, rearranged, combined, performed concurrently, and/or having single stages split into multiple stages. For example, stages 1408 and 1410 for receiving measurement information and computing the location of a UE are optional.

At stage 1402, the method includes transmitting a request for positioning information to a first station, the request including a suggested timing error group embedding scheme. A server 400, such as the LMF 120, including a processor 410 and a transceiver 415, may be means for transmitting a request for positioning to a first station. In an embodiment, referring to FIG. 9, at stage 2 the server 908 may be configured to request reference signal configuration information for a target UE from the first station, such as the serving station 904. The request for positioning information may include assistance data including reference signal transmission properties such as a pathloss reference, spatial relation information. SSB configuration information, or other information required by the first station to determine a range to the target UE. The request for positioning information includes a suggested TEG embedding scheme based on the capabilities of the target UE. For example, the server 908 may request the first station to configure the target UE with a specific TEG embedding scheme such as how many bits should the target UE 902 embed, how many symbols should be used, which reference signals should have TEG information embedded.

At stage 1404, the method includes receiving a positioning information response message including timing error group embedding scheme from the first station. The server 400, including the processor 410 and the transceiver 415, may be means for receiving a positioning information response message. In an embodiment, the first station may be a serving station such as a gNB and configured to determine UL SRS resources for the target UE. The first station may determine the resources available for UL-SRS and then configured the target UE with the UL-SRS resource sets. The first station may also determine a scheme for embedding TEG information in the UL-SRS resources. The TEG embedding scheme determined by the first station may be based on the suggested TEG embedding scheme received, or it may be determined independently by the first station. The first station may provide the UL-SRS configuration information, including the TEG embedding scheme to the server 908.

At stage 1406, the method includes transmitting one or more measurement request messages including the timing error group embedding scheme to one or more neighboring stations. The server 400, including the processor 410 and the transceiver 415, may be means for transmitting the one or more measurement request messages. In an embodiment, referring to FIG. 9, at stage 5, the server 908 may select candidate stations (e.g., neighboring stations 906 and the first station) and provide the UL-SRS configuration information, including the TEG embedding scheme, to the candidate stations in one or more NRPPa messages. Other messaging protocols may also be used. The measurement request messages may include the information required to enable the one or more neighboring stations to perform the UL measurements and to determine the TEG group ID based on TEG information embedded in received UL reference signals.

At stage 1408, the method may optionally include receiving one or more reference signal measurements from the first station and the one or more neighboring stations, the one or more reference signal measurements being based at least on part on the timing error group embedding scheme. The server 400, including the processor 410 and the transceiver 415, may be means for receiving the one or more reference signal measurements. In an embodiment, the first station and/or one or more of the neighboring stations may measure the UL-SRS transmissions from a target UE. The first station and the one or more neighboring stations may decode and apply a TEG group delay value based on TEG information embedded in the UL-SRS signals. The first station and the one or more neighboring stations may report the UL-SRS measurements to the server 908. The UL-SRS measurements may be adjusted based on the TEG group delay information, or the stations may report the TEG information to the server 908 and the server 908 may apply the corresponding TEG group delay information.

At stage 1410, the method optionally includes computing a location of a user equipment based at least in part on the one or more reference signal measurements. The server 400, including the processor 410, may be means for computing a location. In an embodiment, the server 908 may be configured to determine the RTTs from a target UE and for each of the stations (i.e., the first station and/or the one or more neighboring stations) based at least in part on corresponding UL and DL measurements were provided at stage 1408. The server 908 may utilize multi-lateration, or other terrestrial positioning techniques, to calculate the position of the target UE.

Figure 15:
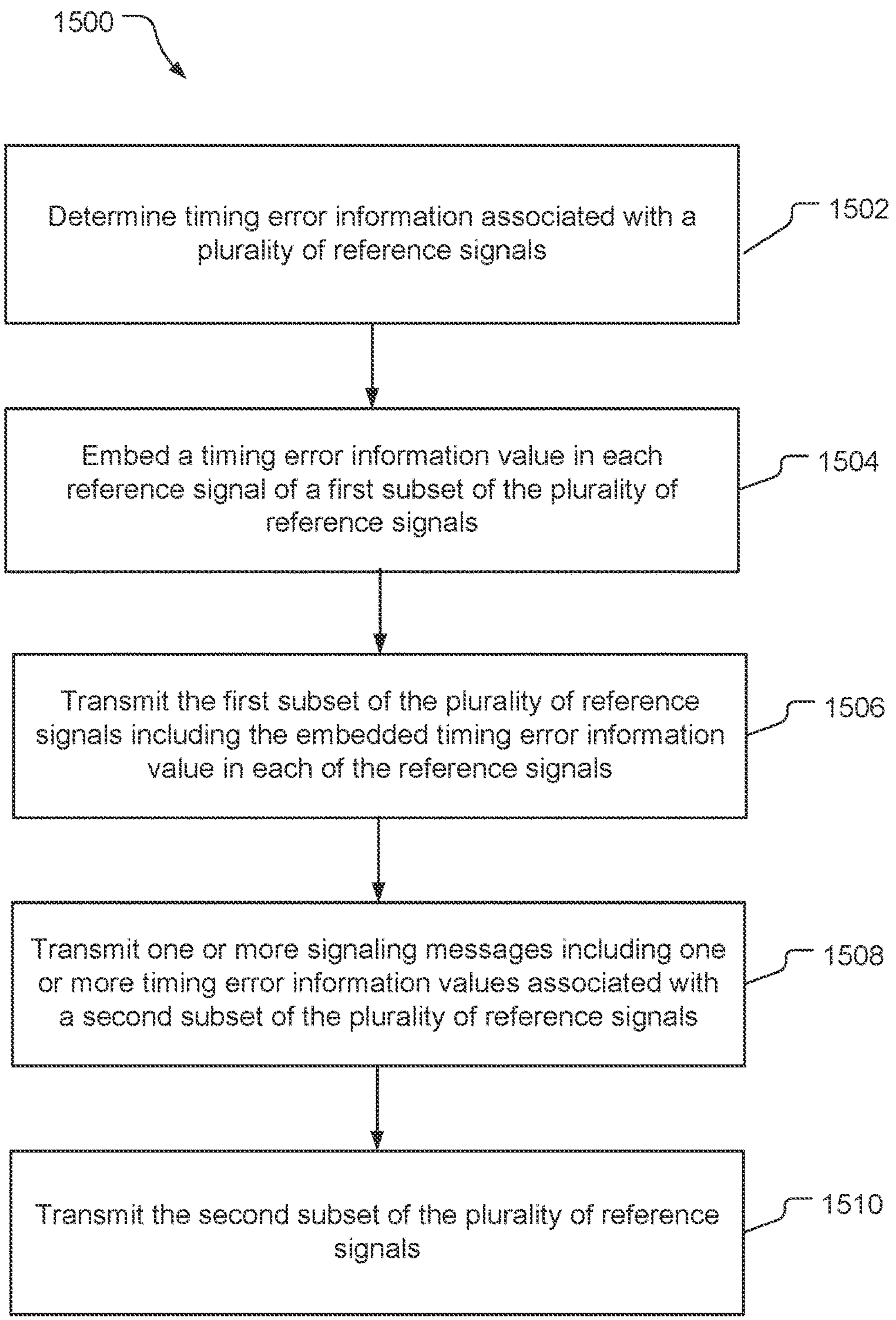
FIG. 15 is a block flow diagram of a method for transmitting reference signals and associated timing error information.

Referring to FIG. 15, with further reference to FIGS. 1-11, a method 1500 for transmitting reference signals and associated timing error information includes the stages shown. The method 1500 is, however, an example only and not limiting. The method 1500 may be altered, e.g., by having stages added, removed, rearranged, combined, performed concurrently, and/or having single stages split into multiple stages.

At stage 1502, the method includes determining timing error information associated with a plurality of reference signals. The UE 200, including the processor 230, may be a means for determining timing error information. In an embodiment, referring to FIG. 9, the target UE 902 may receive reference signal configuration information, including timing error information such as a TEG embedding schema from the serving station 904. The TEG embedding schema may indicate how many bits the target UE 902 should embed, how many symbols should be used, and which reference signals should have TEG information embedded. The embedding schema may include one or more data structures to associate the TEG information with a scrambling ID, cyclic shift configuration, or other orthogonal sequences. The UE 902 may be configured to embed TEG information in some reference signals, and not embed the TEG information in other reference signals. In an example, the embedding schema may include a first subset of SRS resources which will include embedded TEG information, and a second subset of SRS resources which will not include embedded TEG information. In an embodiment, the TEG embedding schema may include a bandwidth limit such that SRS resources utilizing a limited bandwidth (e.g., below a threshold bandwidth) may not include embedded TEG information. In an example, the UE 902 may configure TEG embedding based on the capabilities of neighboring stations. For example, a station may not be configured to decode TEG information, or the station may be at a distance which may diminish the ability to decode the TEG information. Other operational requirements may also be used to determine which reference signals should include embedded TEG information.

At stage 1504, the method includes embedding a timing error information value in each reference signal of a first subset of the plurality of reference signals. The UE 200, including the processor 230, may be a means for embedding the timing error information value. For each of the first subset of reference signals, the UE 200 may be configured to embed TEG values, such as a TEG group ID, in a group of symbols in the reference signal or in the whole reference signal resource. In an embodiment, the UE 200 may be configure to embed the timing error information value based on one or more data structures associated with TEG information. For example, the UE 200 may configure particular scrambling IDs and/or cyclic shifts for each of the reference signals in the first subset, such that the particular scrambling IDs and cyclic shifts are associated with different TEG group IDs. In an example, the UE 200 may utilize a single scrambling ID with one or more orthogonal sequences to embed the TEG value. Other combinations of embedding schemes may also be used.

At stage 1506, the method includes transmitting the first subset of the plurality of reference signals including the embedded timing error information value in each of the reference signals. The UE 200, including the processor 230 and the wireless transceiver 240, may be a means for transmitting the first subset of reference signals. In an example, the first subset of reference signals may be SRS for positioning signals and may utilize one of the OFDM time and frequency domain patterns such as depicted in FIG. 8. In an embodiment, the first subset of reference signals may be transmitted via a sidelink (e.g., sidelink SRS). The first subset of the plurality of reference signals may be received by one or more stations configured to determine the TEG information based on the embedded timing error information value.

At stage 1508, the method may include transmitting one or more signaling messages including one or more the timing error information values associated with a second subset of the plurality of reference signals. The UE 200, including the processor 230 and the wireless transceiver 240, may be a means for transmitting the signaling messages. The UE 200 may be configured to transmit the second set of reference signals which do not include embedded timing error information. The signaling messages may report the timing error information value via one or more alternative paths, such as via MAC-CE messaging through the serving station 904 and then to the server 908 via NRPPa messaging. Other alternative paths may also be used to provide timing error information to stations which may not, or cannot, decode embedded timing error information.

At stage 1510, the method includes transmitting the second subset of the plurality of reference signals. The UE 200, including the processor 230 and the wireless transceiver 240, may be a means for transmitting the second subset of reference signals. In an example, the second subset of the plurality of reference signals may include SRS for positioning signals and may utilize one of the OFDM time and frequency domain patterns such as depicted in FIG. 8. In an example, a reference signal in the second subset of reference signals may be intended for a far-away station, and the geometry may be insufficient for detecting embedded TEG information. The second subset of reference signals may be transmitted for stations which may not be configured to detect embedded TEG information. In an embodiment, one or more reference signals in the second subset of reference signals may be transmitted via a sidelink (e.g., sidelink SRS).

Figure 16:
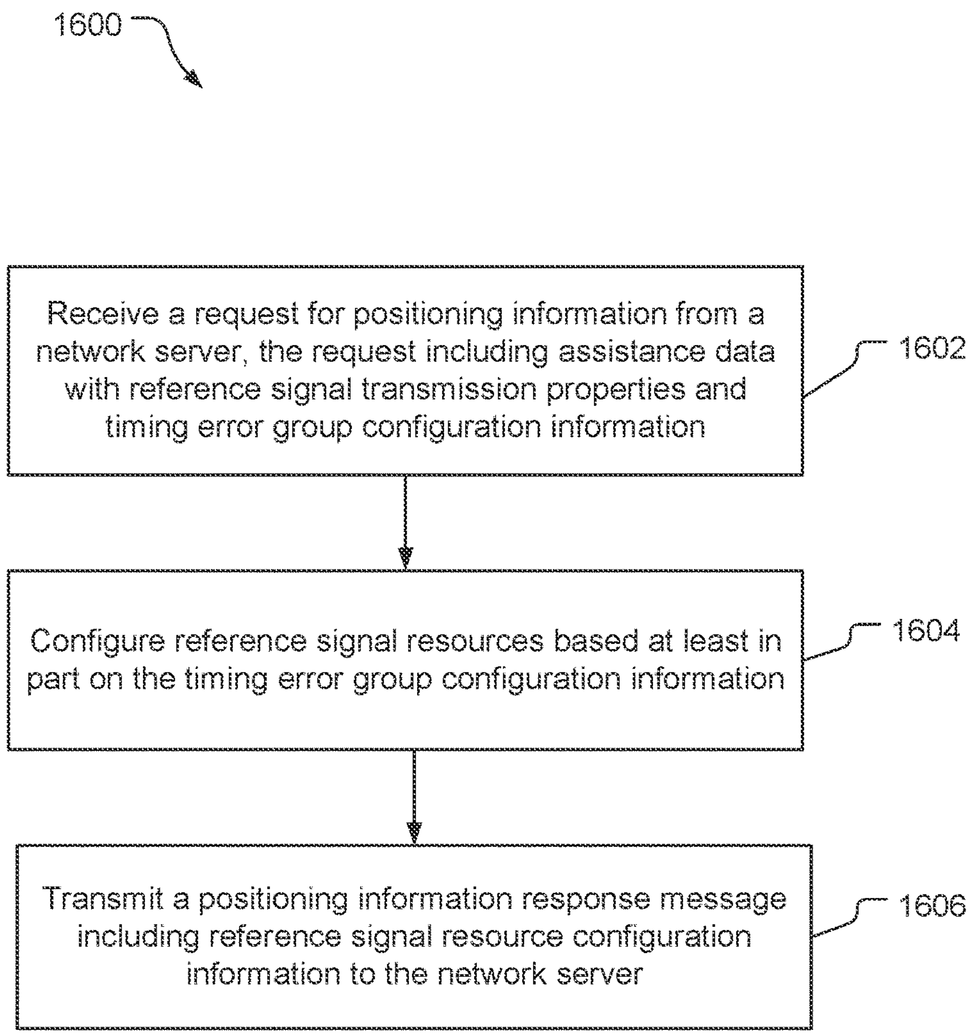
FIG. 16 is a block flow diagram of a method for configuring reference signals based on timing error group information.

Referring to FIG. 16, with further reference to FIGS. 1-11, a method 1600 for configuring reference signals based on timing error group information includes the stages shown. The method 1600 is, however, an example only and not limiting. The method 1600 may be altered. e.g., by having stages added, removed, rearranged, combined, performed concurrently, and/or having single stages split into multiple stages.

At stage 1602, the method includes receiving a request for positioning information from a network server, the request including assistance data with reference signal transmission properties and timing error group configuration information. A TRP 300, such as the gNB 110*a*, including a processor 310 and a transceiver 315, may be a means for receiving the request for positioning information. In an embodiment, a network server such as the LMF 120 may utilize one or more NRPPa positioning information request messages to request UL-SRS configuration information for a target UE. The network server may also provide assistance data including reference signal transmission properties such as a pathloss reference, spatial relation information, SSB configuration information, or other information required to determine a range to the target. The network server may also provide suggested TEG embedding information based on the capabilities of the target UE. For example, the network server may request to configure the target UE with a specific TEG embedding schema (e.g., how many bits should the target UE embed, how many symbols should be used, and which SRS resources should have TEG information embedded).

At stage 1604, the method includes configuring reference signal resources based at least in part on the timing error group configuration information. The TRP 300, including the processor 310 and the transceiver 315, may be a means for configuring reference signal resources. In an embodiment, a serving station may be configured to determine the resources available for UL-SRS and configured the target UE with the UL-SRS resource sets. The serving station may also be configured to determine a schema for embedding TEG information in the UL-SRS resources. The schema may be based on the suggested TEG embedding information received from the network server at stage 1602, or based on other operational requirements (e.g., band conditions, throughput, etc.). The serving station may transmit the reference signal resource configuration information including a TEG embedding schema to the target UE. The TEG embedding schema, may include scrambling ID and/or cyclic shift data structures, and may indicate which part of the reference signal resource may be used to embed the TEG information. In an example, the configuration information may also indicate which part of the reference signal resource may be used with a legacy/constant SRS waveform and thus will not include embedded TEG information.

At stage 1606, the method includes transmitting a positioning information response message including reference signal resource configuration information to the network server. The TRP 300, including the processor 310 and the transceiver 315, may be a means for transmitting the positioning response message. In an example, the positioning information response message may include UL-SRS configuration information, and the corresponding embedded TEG schema information configured at stage 1604. The positioning information response message is configured to enable the network server to provide candidate stations with the reference signal configuration information, including the embedded TEG schema information, to enable the candidate stations to receive reference signals transmitted from the target UE.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms “a,” “an,” and “the” include the plural forms as well, unless the context clearly indicates otherwise. The terms “comprises,” “comprising,” “includes,” and/or “including,” as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is “based on” an item or condition means that the function or operation is based on the stated item or condition and may be based on one or more items and/or conditions in addition to the stated item or condition.

Also, as used herein, “or” as used in a list of items prefaced by “at least one of” or prefaced by “one or more of” indicates a disjunctive list such that, for example, a list of “at least one of A, B, or C,” or a list of “one or more of A, B, or C” means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of “a processor configured to measure at least one of A or B” means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of “a processor configured to at least one of measure X or measure Y” means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for determining a timing error group associated with internal timing errors of a first station, comprising: receiving a reference signal including embedded timing error group information from a first station; and determining a timing group error value based at least in part on the embedded timing error group information.
2. The method of clause 1 further comprising transmitting the timing group error value to a second station.
3. The method of clause 1 wherein the embedded timing error group information is embedded in a symbol in the reference signal.
4. The method of clause 1 wherein the embedded timing error group information is embedded in a group of symbols in the reference signal.
5. The method of clause 4 wherein the group of symbols includes non-consecutive symbols in the reference signal.
6. The method of clause 1 wherein the embedded timing error group information is embedded in each symbol of the reference signal.
7. The method of clause 1 wherein the reference signal is based on one reference signal resource in a set of reference signal resources, wherein the embedded timing error group information is embedded in each reference signal resource in the set of reference signal resources.
8. The method of clause 1 wherein the embedded timing error group information is embedded based at least in part on a scrambling identification associated with the reference signal.
9. The method of clause 8 wherein the reference signal is configured with one of a plurality of scrambling identification values and each of the plurality of scrambling identification values is associated with one timing error group identification value.
10. The method of clause 1 wherein the embedded timing error group information is embedded based at least in part on a cyclic shift configuration with the reference signal.
11. The method of clause 10 wherein the reference signal is configured with one of a plurality of cyclic shift configurations and each of the plurality of cyclic shift configurations is associated with one timing error group identification value.
12. The method of clause 1 wherein the embedded timing error group information is embedded based at least in part on a scrambling identification of the reference signal and an orthogonal sequence in the reference signal.

13. The method of clause 12 wherein the reference signal is associated with a single scrambling identification value and one of a plurality of orthogonal sequences, wherein a first and a second timing error group identification values are associated with a respective positive and negative values in each resource element in the reference signal.
14. The method of clause 1 wherein the reference signal including the embedded timing error group information is received via a sidelink.
15. A method for configuring reference signals based on timing error group information, comprising: receiving a request for positioning information from a network server, the request including assistance data with reference signal transmission properties and timing error group configuration information; configuring reference signal resources based at least in part on the timing error group configuration information; and transmitting a positioning information response message including reference signal resource configuration information to the network server.
16. The method of clause 15 wherein the configuring reference signal resources includes transmitting one or more reference signal resources including the timing error group configuration information to a target user equipment.
17. The method of clause 15 wherein the timing error group configuration information in the request for positioning information includes an indication of a number of bits to be embedded in a reference signal, wherein the number of bits identifies one or more timing error group configurations.
18. The method of clause 15 wherein the timing error group configuration information in the request for positioning information includes an indication of a number of symbols to be used to embed an indication of one or more timing error group configurations.
19. The method of clause 15 wherein the timing error group configuration information in the request for positioning information includes an indication of one or more reference signal resources to be embedded with one or more timing error group configurations.
20. The method of clause 15 wherein the reference signal transmission properties include at least one of a pathloss reference, spatial relation information, and synchronization signal block configuration information.
21. A method for providing timing error information associated with a reference signal, comprising: determining timing error information associated with the reference signal; embedding the timing error information in the reference signal; and transmitting the reference signal including the embedded timing error information.
22. The method of clause 21 further comprising transmitting one or more signaling messages including the timing error information.
23. The method of clause 22 wherein the one or more signaling messages includes a medium access control control element.
24. The method of clause 21 wherein the embedded timing error information is embedded in a symbol in the reference signal.
25. The method of clause 21 wherein the embedded timing error information is embedded in a group of symbols in the reference signal.
26. The method of clause 25 wherein the group of symbols includes non-consecutive symbols in the reference signal.
27. The method of clause 21 wherein the embedded timing error information is embedded in each symbol of the reference signal.
28. The method of clause 21 wherein the reference signal is based on one reference signal resource in a set of reference signal resources, wherein the embedded timing error information is embedded in each reference signal resource in the set of reference signal resources.
29. The method of clause 21 wherein the embedded timing error information is embedded based at least in part on a scrambling identification in the reference signal.
30. The method of clause 29 wherein the reference signal is configured with one of a plurality of scrambling identification values and each of the plurality of scrambling identification values is associated with a timing error group identification value.
31. The method of clause 21 wherein the embedded timing error information is embedded based at least in part on a cyclic shift in the reference signal.
32. The method of clause 31 wherein the reference signal is configured with one of a plurality of cyclic shift configurations and each of the plurality of cyclic shift configurations is associated with one timing error group identification value.
33. The method of clause 21 wherein the embedded timing error information is embedded based at least in part on a scrambling identification of the reference signal and an orthogonal sequence in the reference signal.
34. The method of clause 33 wherein the reference signal is associated with a single scrambling identification value and one of a plurality of orthogonal sequences, wherein the embedded timing error information is one of a first and a second timing error group identification values associated with a respective positive and negative values in each resource element in the reference signal.
35. The method of clause 21 wherein the reference signal including the embedded timing error information is transmitted via a sidelink.
36. A method for providing reference signal and timing error information to network stations, comprising: transmitting a request for positioning information to a first station, the request including a suggested timing error group embedding scheme; receiving a positioning information response message including a timing error group embedding scheme from the first station; and transmitting one or more measurement request messages including the timing error group embedding scheme to one or more neighboring stations.
37. The method of clause 36 further comprising: receiving one or more reference signal measurements from the first station and the one or more neighboring stations, the one or more reference signal measurements being based at least on part on the timing error group embedding scheme; and computing a location of a user equipment based at least in part on the one or more reference signal measurements.
38. The method of clause 36 wherein the one or more neighboring stations includes a transmission reception point.
39. The method of clause 36 wherein the one or more neighboring stations includes a user equipment.

40. The method of clause 36 wherein the one or more neighboring stations includes a roadside unit.
41. The method of clause 36 wherein the suggested timing error group embedding scheme in the request for positioning information includes an indication of a number of bits to be embedded in a reference signal, wherein the number of bits identifies one or more timing error group configurations.
42. The method of clause 36 wherein the suggested timing error group embedding scheme in the request for positioning information includes an indication of a number of symbols to be used to embed an indication of one or more timing error group configurations.
43. The method of clause 36 wherein the suggested timing error group embedding scheme in the request for positioning information includes an indication of one or more reference signal resources to be embedded with one or more timing error group configurations.
44. An apparatus, comprising: a memory, at least one transceiver; at least one processor communicatively coupled to the memory and the at least one transceiver, and configured to: receive a reference signal including embedded timing error group information from a first station; and determine a timing group error value based at least in part on the embedded timing error group information.
45. The apparatus of clause 44 wherein the at least one processor is further configured to transmit the timing group error value to a second station.
46. The apparatus of clause 44 wherein the embedded timing error group information is embedded in a symbol in the reference signal.
47. The apparatus of clause 44 wherein the embedded timing error group information is embedded in a group of symbols in the reference signal.
48. The apparatus of clause 47 wherein the group of symbols includes non-consecutive symbols in the reference signal.
49. The apparatus of clause 44 wherein the embedded timing error group information is embedded in each symbol of the reference signal.
50. The apparatus of clause 44 wherein the reference signal is based on one reference signal resource in a set of reference signal resources, wherein the embedded timing error group information is embedded in each reference signal resource in the set of reference signal resources.
51. The apparatus of clause 44 wherein the embedded timing error group information is embedded based at least in part on a scrambling identification associated with the reference signal.
52. The apparatus of clause 51 wherein the reference signal is configured with one of a plurality of scrambling identification values and each of the plurality of scrambling identification values is associated with one timing error group identification value.
53. The apparatus of clause 44 wherein the embedded timing error group information is embedded based at least in part on a cyclic shift configuration with the reference signal.
54. The apparatus of clause 53 wherein the reference signal is configured with one of a plurality of cyclic shift configurations and each of the plurality of cyclic shift configurations is associated with one timing error group identification value.
55. The apparatus of clause 53 wherein the embedded timing error group information is embedded based at least in part on a scrambling identification of the reference signal and an orthogonal sequence in the reference signal.
56. The apparatus of clause 55 wherein the reference signal is associated with a single scrambling identification value and one of a plurality of orthogonal sequences, wherein a first and a second timing error group identification values are associated with a respective positive and negative values in each resource element in the reference signal.
57. The apparatus of clause 44 wherein the at least one transceiver is configured to receive sidelink signals, and the reference signal including the embedded timing error group information is received via one or more sidelink signals.
58. An apparatus, comprising: a memory; at least one transceiver; at least one processor communicatively coupled to the memory and the at least one transceiver, and configured to: receive a request for positioning information from a network server, the request including assistance data with reference signal transmission properties and timing error group configuration information; configure reference signal resources based at least in part on the timing error group configuration information; and transmit a positioning information response message including reference signal resource configuration information to the network server.
59. The apparatus of clause 58 wherein the at least one processor is further configured to transmit one or more reference signal resources including the timing error group configuration information to a target user equipment.
60. The apparatus of clause 58 wherein the timing error group configuration information in the request for positioning information includes an indication of a number of bits to be embedded in a reference signal, wherein the number of bits identifies one or more timing error group configurations.
61. The apparatus of clause 58 wherein the timing error group configuration information in the request for positioning information includes an indication of a number of symbols to be used to embed an indication of one or more timing error group configurations.
62. The apparatus of clause 58 wherein the timing error group configuration information in the request for positioning information includes an indication of one or more reference signal resources to be embedded with one or more timing error group configurations.
63. The apparatus of clause 58 wherein the reference signal transmission properties include at least one of a pathloss reference, spatial relation information, and synchronization signal block configuration information.
64. An apparatus, comprising: a memory; at least one transceiver; at least one processor communicatively coupled to the memory and the at least one transceiver, and configured to: determine timing error information associated with a reference signal; embed the timing error information in the reference signal; and transmit the reference signal including the embedded timing error information.
65. The apparatus of clause 64 wherein the at least one processor is further configured to transmit one or more signaling messages including the timing error information.

66. The apparatus of clause 65 wherein the one or more signaling messages includes a medium access control control element.
67. The apparatus of clause 64 wherein the embedded timing error information is embedded in a symbol in the reference signal.
68. The apparatus of clause 64 wherein the embedded timing error information is embedded in a group of symbols in the reference signal.
69. The apparatus of clause 68 wherein the group of symbols includes non-consecutive symbols in the reference signal.
70. The apparatus of clause 64 wherein the embedded timing error information is embedded in each symbol of the reference signal.
71. The apparatus of clause 64 wherein the reference signal is based on one reference signal resource in a set of reference signal resources, wherein the embedded timing error information is embedded in each reference signal resource in the set of reference signal resources.
72. The apparatus of clause 64 wherein the embedded timing error information is embedded based at least in part on a scrambling identification in the reference signal.
73. The apparatus of clause 72 wherein the reference signal is configured with one of a plurality of scrambling identification values and each of the plurality of scrambling identification values is associated with a timing error group identification value.
74. The apparatus of clause 64 wherein the embedded timing error information is embedded based at least in part on a cyclic shift in the reference signal.
75. The apparatus of clause 74 wherein the reference signal is configured with one of a plurality of cyclic shift configurations and each of the plurality of cyclic shift configurations is associated with one timing error group identification value.
76. The apparatus of clause 64 wherein the embedded timing error information is embedded based at least in part on a scrambling identification of the reference signal and an orthogonal sequence in the reference signal.
77. The apparatus of clause 76 wherein the reference signal is associated with a single scrambling identification value and one of a plurality of orthogonal sequences, wherein the embedded timing error information is one of a first and a second timing error group identification values associated with a respective positive and negative values in each resource element in the reference signal.
78. The apparatus of clause 64 wherein the reference signal including the embedded timing error information is transmitted via a sidelink.
79. An apparatus, comprising: a memory; at least one transceiver; at least one processor communicatively coupled to the memory and the at least one transceiver, and configured to: transmit a request for positioning information to a first station, the request including a suggested timing error group embedding scheme; receive a positioning information response message including a timing error group embedding scheme from the first station; and transmit one or more measurement request messages including the timing error group embedding scheme to one or more neighboring stations.
80. The apparatus of clause 79 wherein the at least one processor is further configured to: receive one or more reference signal measurements from the first station and the one or more neighboring stations, the one or more reference signal measurements being based at least on part on the timing error group embedding scheme; and compute a location of a user equipment based at least in part on the one or more reference signal measurements.
81. The apparatus of clause 79 wherein the one or more neighboring stations includes a transmission reception point.
82. The apparatus of clause 79 wherein the one or more neighboring stations includes a user equipment.
83. The apparatus of clause 79 wherein the one or more neighboring stations includes a roadside unit.
84. The apparatus of clause 79 wherein the suggested timing error group embedding scheme in the request for positioning information includes an indication of a number of bits to be embedded in a reference signal, wherein the number of bits identifies one or more timing error group configurations.
85. The apparatus of clause 79 wherein the suggested timing error group embedding scheme in the request for positioning information includes an indication of a number of symbols to be used to embed an indication of one or more timing error group configurations.
86. The apparatus of clause 79 wherein the suggested timing error group embedding scheme in the request for positioning information includes an indication of one or more reference signal resources to be embedded with one or more timing error group configurations.
87. An apparatus for determining a timing error group associated with internal timing errors of a first station, comprising: means for receiving a reference signal including embedded timing error group information from a first station; and means for determining a timing group error value based at least in part on the embedded timing error group information.
88. An apparatus for configuring reference signals based on timing error group information, comprising: means for receiving a request for positioning information from a network server, the request including assistance data with reference signal transmission properties and timing error group configuration information; means for configuring reference signal resources based at least in part on the timing error group configuration information; and means for transmitting a positioning information response message including reference signal resource configuration information to the network server.
89. An apparatus for providing timing error information associated with a reference signal, comprising: means for determining timing error information associated with the reference signal; means for embedding the timing error information in the reference signal; and means for transmitting the reference signal including the embedded timing error information.
90. An apparatus for providing reference signal and timing error information to network stations, comprising: means for transmitting a request for positioning information to a first station, the request including a suggested timing error group embedding scheme; means for receiving a positioning information response message including a timing error group embedding scheme from the first station; and means for transmitting one or more measurement request messages including the timing error group embedding scheme to one or more neighboring stations.

91. A non-transitory processor-readable storage medium comprising processor-readable instructions configured to cause one or more processors to determine a timing error group associated with internal timing errors of a first station, comprising: code for receiving a reference signal including embedded timing error group information from a first station; and code for determining a timing group error value based at least in part on the embedded timing error group information.

92. A non-transitory processor-readable storage medium comprising processor-readable instructions configured to cause one or more processors to configure reference signals based on timing error group information, comprising: code for receiving a request for positioning information from a network server, the request including assistance data with reference signal transmission properties and timing error group configuration information; code for configuring reference signal resources based at least in part on the timing error group configuration information; and code for transmitting a positioning information response message including reference signal resource configuration information to the network server.

93. A non-transitory processor-readable storage medium comprising processor-readable instructions configured to cause one or more processors to provide timing error information associated with a reference signal, comprising: code for determining timing error information associated with the reference signal; code for embedding the timing error information in the reference signal; and code for transmitting the reference signal including the embedded timing error information.

94. A non-transitory processor-readable storage medium comprising processor-readable instructions configured to cause one or more processors to provide reference signal and timing error information to network stations, comprising: code for transmitting a request for positioning information to a first station, the request including a suggested timing error group embedding scheme; code for receiving a positioning information response message including a timing error group embedding scheme from the first station; and code for transmitting one or more measurement request messages including the timing error group embedding scheme to one or more neighboring stations.

The invention claimed is:

1. A method for determining a timing error group associated with internal timing errors of a first station, comprising:

receiving a reference signal from the first station, wherein the received reference signal comprises embedded timing error group information; and determining a timing group error value based at least in part on the embedded timing error group information.

2. The method of claim 1 further comprising:

transmitting the timing group error value to a second station.

3. The method of claim 1 wherein the embedded timing error group information is embedded in a symbol in the reference signal.

4. The method of claim 1 wherein the embedded timing error group information is embedded in a group of symbols in the reference signal.

5. The method of claim 4 wherein the group of symbols includes non-consecutive symbols in the reference signal.

6. The method of claim 1 wherein the embedded timing error group information is embedded in each symbol of the reference signal.

7. The method of claim 1 wherein the reference signal is based on one reference signal resource in a set of reference signal resources, wherein the embedded timing error group information is embedded in each reference signal resource in the set of reference signal resources.

8. The method of claim 1 wherein the embedded timing error group information is embedded based at least in part on a scrambling identification associated with the reference signal.

9. The method of claim 8 wherein the reference signal is configured with one of a plurality of scrambling identification values and each of the plurality of scrambling identification values is associated with one timing error group identification value.

10. The method of claim 1 wherein the embedded timing error group information is embedded based at least in part on a cyclic shift configuration with the reference signal.

11. The method of claim 10 wherein the reference signal is configured with one of a plurality of cyclic shift configurations and each of the plurality of cyclic shift configurations is associated with one timing error group identification value.

12. The method of claim 1 wherein the embedded timing error group information is embedded based at least in part on a scrambling identification of the reference signal and an orthogonal sequence in the reference signal.

13. The method of claim 12 wherein the reference signal is associated with a single scrambling identification value and one of a plurality of orthogonal sequences, wherein a first and a second timing error group identification values are associated with a respective positive and negative values in each resource element in the reference signal.

14. The method of claim 1 wherein the reference signal including the embedded timing error group information is received via a sidelink.

15. An apparatus, comprising:

a memory;

at least one transceiver; and at least one processor communicatively coupled to the memory and the at least one transceiver, and configured to:

receive a request for positioning information from a network server, the request including assistance data with reference signal transmission properties and timing error group configuration information;

configure reference signal resources within a reference signal for embedding timing error group information based at least in part on the timing error group configuration information; and transmit a positioning information response message including an indication of the configured reference signal resources to the network server.

16. The apparatus of claim 15 wherein the at least one processor is further configured to:

transmit one or more reference signal resources including the timing error group configuration information to a target user equipment.

17. The apparatus of claim 15 wherein the request for positioning information includes a second indication of a number of bits to be embedded in the reference signal, wherein the number of bits identifies one or more timing error group configurations.

18. The apparatus of claim 15 wherein the request for positioning information includes a second indication of a number of symbols of the reference signal to be used to embed a third indication of one or more timing error group configurations.

19. The apparatus of claim 15 wherein in the request for positioning information includes a second indication of one or more reference signal resources of the reference signal to be embedded with one or more timing error group configurations.

20. The apparatus of claim 15 wherein the reference signal transmission properties include at least one of a pathloss reference, spatial relation information, and synchronization signal block configuration information.

21. An apparatus, comprising:

a memory;

at least one transceiver; and at least one processor communicatively coupled to the memory and the at least one transceiver, and configured to:

determine timing error information associated with a reference signal;

embed the timing error information in the reference signal; and transmit the reference signal comprising the embedded timing error information.

22. The apparatus of claim 21 wherein the at least one processor is further configured to;

transmit one or more signaling messages including the timing error information.

23. The apparatus of claim 22 wherein the one or more signaling messages includes a medium access control control element.

24. The apparatus of claim 21 wherein the embedded timing error information is embedded in a symbol in the reference signal.

25. The apparatus of claim 21 wherein the embedded timing error information is embedded in a group of symbols in the reference signal.

26. The apparatus of claim 21 wherein the embedded timing error information is embedded in each symbol of the reference signal.

27. The apparatus of claim 21 wherein the embedded timing error information is embedded based at least in part on a scrambling identification in the reference signal.

28. The apparatus of claim 21 wherein the embedded timing error information is embedded based at least in part on a cyclic shift in the reference signal.

29. The apparatus of claim 21 wherein the reference signal including the embedded timing error information is transmitted via a sidelink.

30. An apparatus for determining a timing error group associated with internal timing errors of a first station, comprising:

means for receiving a reference signal from the first station, wherein the received reference signal comprises embedded timing error group information; and means for determining a timing group error value based at least in part on the embedded timing error group information.

* * * * *